United States Patent
Pisarevich

(10) Patent No.: US 12,483,768 B2
(45) Date of Patent: Nov. 25, 2025

(54) SYSTEM FOR MOUNTING AND REGISTRATION OF A SENSOR TO SURFACES

(71) Applicant: VergeSense, Inc., Mountain View, CA (US)

(72) Inventor: Yuri Pisarevich, Mountain View, CA (US)

(73) Assignee: VergeSense, Inc., Mountain View, CA (US)

( * ) Notice: Subject to any disclaimer, the term of this patent is extended or adjusted under 35 U.S.C. 154(b) by 840 days.

(21) Appl. No.: 17/737,629

(22) Filed: May 5, 2022

(65) Prior Publication Data

US 2022/0263985 A1    Aug. 18, 2022

Related U.S. Application Data

(63) Continuation-in-part of application No. 17/102,357, filed on Nov. 23, 2020, now Pat. No. 11,765,449.

(60) Provisional application No. 62/939,549, filed on Nov. 22, 2019.

(51) Int. Cl.
| | |
|---|---|
| H04N 23/54 | (2023.01) |
| G06V 20/52 | (2022.01) |
| G06V 40/10 | (2022.01) |
| H04N 23/51 | (2023.01) |

(52) U.S. Cl.
CPC ............ *H04N 23/54* (2023.01); *G06V 20/52* (2022.01); *G06V 40/10* (2022.01); *H04N 23/51* (2023.01)

(58) Field of Classification Search
CPC ........ H04N 23/54; H04N 23/51; G06V 20/52; G06V 40/10

USPC ......................................................... 348/143
See application file for complete search history.

(56) References Cited

U.S. PATENT DOCUMENTS

| | | | | |
|---|---|---|---|---|
| 6,268,882 B1* | 7/2001 | Elberbaum | ............ | H04N 7/183 |
| | | | | 348/E7.087 |
| 8,821,045 B1* | 9/2014 | De Pape | .......... | G08B 13/19617 |
| | | | | 348/143 |
| 9,992,389 B1* | 6/2018 | Fu | ........................ | F21V 33/0056 |
| 10,041,919 B1* | 8/2018 | Wood | ................. | G01N 33/0055 |
| 11,304,274 B1* | 4/2022 | Fu | ........................ | F21V 33/0076 |
| 2008/0002026 A1* | 1/2008 | Okamura | ............... | H04N 7/183 |
| | | | | 348/E7.087 |
| 2015/0358538 A1* | 12/2015 | Donaldson | ............. | H04N 23/90 |
| | | | | 348/38 |

(Continued)

*Primary Examiner* — Matthew David Kim
(74) *Attorney, Agent, or Firm* — Run8 Patent Group, LLC; Peter Miller

(57) ABSTRACT

A system for mounting an image sensor to a surface including: a sensor block having a housing defining a front face and a rear face and a set of engagement features; an image sensor arranged in the housing, facing outwardly from the front face, and a receptacle arranged on the rear face configured to receive an electrical cable. The system also includes a universal bracket defining a mounting plate including: a cutaway feature arranged on the universal bracket configured to pass the electrical cable to the receptacle; a set of latches; a mounting bore configured to receive a mounting rod; a set of through-holes configured to receive a set of fasteners to mount the universal bracket; a set of standoffs extending below the mounting plate; and a set of retention features arranged on the set of standoffs configured to transiently engage and retain the engagement features of the housing.

19 Claims, 15 Drawing Sheets

(56) References Cited

U.S. PATENT DOCUMENTS

| | | | | |
|---|---|---|---|---|
| 2018/0120672 A1* | 5/2018 | Huang | .................... | G03B 17/02 |
| 2019/0041245 A1* | 2/2019 | Griggs | ................. | G01D 11/245 |
| 2019/0297231 A1* | 9/2019 | Song | ...................... | G08G 1/142 |
| 2020/0241396 A1* | 7/2020 | Park | ...................... | G03B 17/561 |
| 2021/0241493 A1* | 8/2021 | Koblin | ....................... | G06T 7/38 |
| 2021/0348746 A1* | 11/2021 | Wu | ......................... | F21V 21/29 |

\* cited by examiner

SYSTEM FOR MOUNTING AND REGISTRATION OF A SENSOR TO SURFACES

CROSS-REFERENCE TO RELATED APPLICATIONS

This Application is a continuation-in-part of U.S. patent application Ser. No. 17/102,357, filed on 23 Nov. 2020, which claims the benefit of U.S. Provisional Application No. 62/939,549, filed on 22 Nov. 2019, each of which is incorporated in its entirety by this reference.

TECHNICAL FIELD

This invention relates generally to the field of ceiling and wall mounting hardware and more specifically to a new and useful method for mounting a sensor to surfaces in the field of ceiling and wall mounting hardware.

DESCRIPTION OF THE EMBODIMENTS

Figure 1:
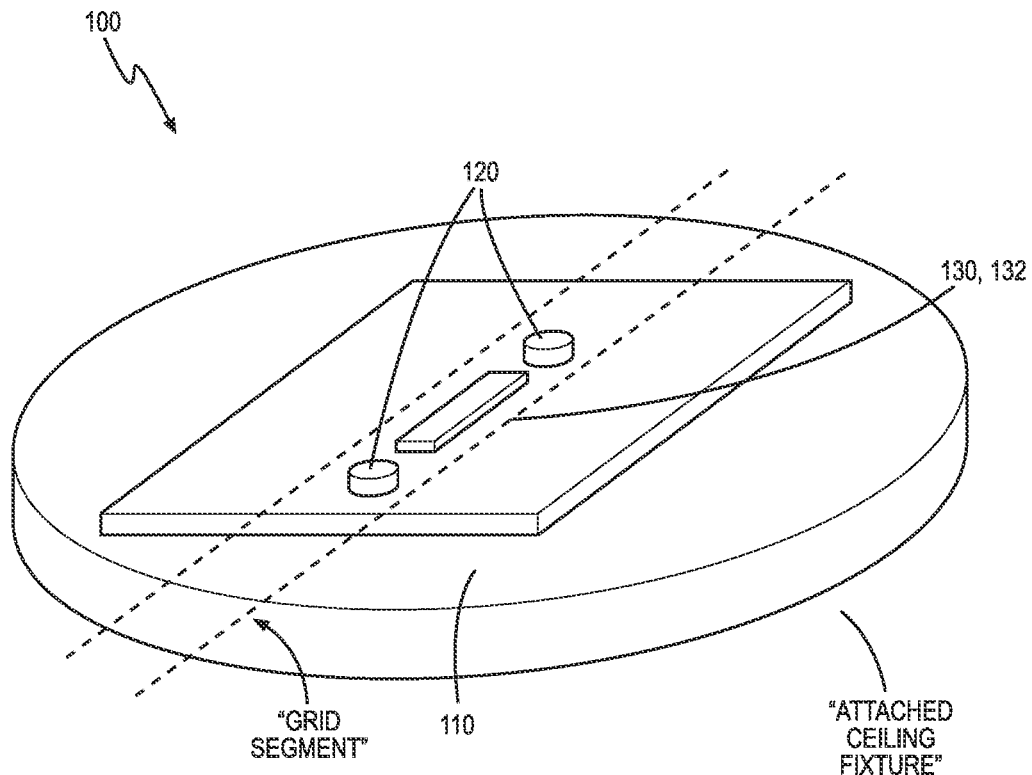
FIG. 1 is a schematic representation of a first system.
Figure 1:
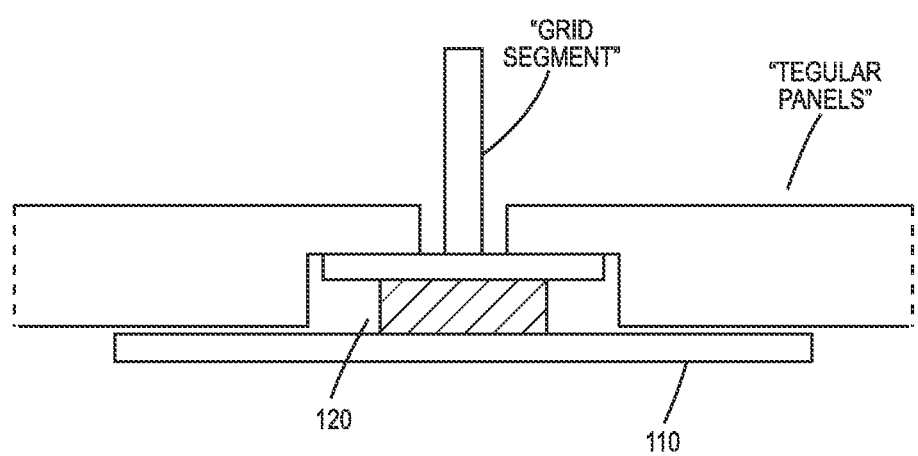

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First System

As shown FIG. 1, a mounting system 100 (hereinafter "the first system 100") for repeatably mounting a ceiling fixture to a grid ceiling, including a set of ceiling tiles supported by an assembly of grid segments, includes a mounting member no defining an upper face 112 and a lower face 114 opposite the upper face 112. The system 100 also includes a first magnet 122: fixed to the upper face 112; characterized by a first height greater than a protrusion distance of the outer surface of a ceiling tile in the set of ceiling tiles below a grid segment in the assembly of grid segments; and characterized by a first width less than an exposed width of the grid segment. The system 100 additionally includes a second magnet 124 fixed to the upper face 112 and characterized by the first height. The system 100 further includes a registration feature 130: arranged on the upper face 112; configured to align with the assembly of grid segments while the first magnet 122 and the second magnet 124 are magnetically coupled to the assembly of grid segments; characterized by a second height less than the first height; and characterized by a second width less than the exposed width of the grid segment.

Figure 9:
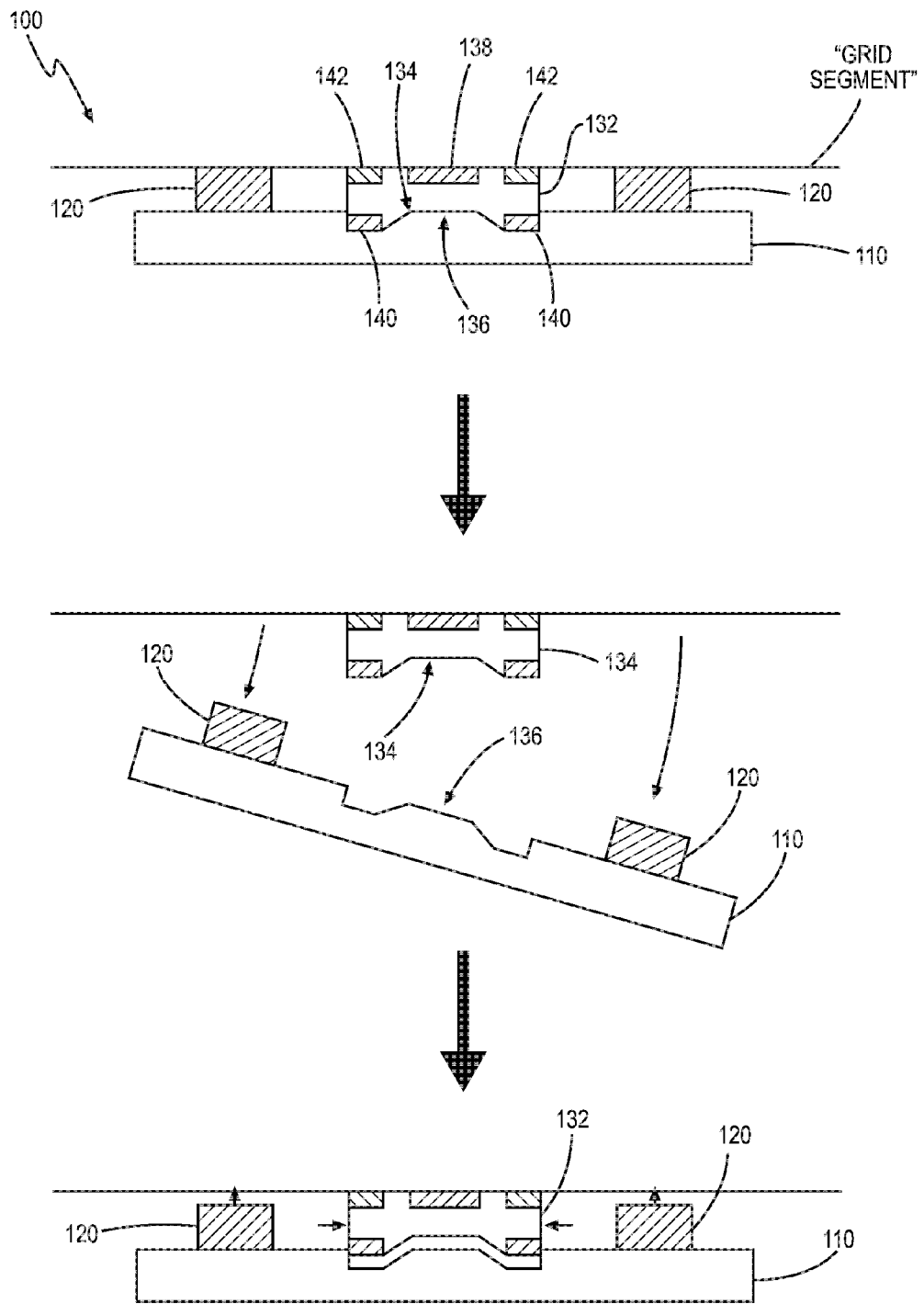
FIG. 9 is a schematic representation of one variation of the first system.

As shown in FIG. 9, one variation of the system 100 includes: a mounting member no defining an upper face 112. This variation of the system 100 also includes a first magnet 122: fixed to the upper face 112; characterized by a first height greater than a protrusion distance of the outer surface of a ceiling tile in the set of ceiling tiles below a grid segment in the assembly of grid segments; and characterized by a first width less than an exposed width of the grid segment. This variation of the system 100 additionally includes a second magnet 124: fixed to the upper face 112; and characterized by the first height. This variation of the system 100 further includes a detachable registration feature 132: transiently coupled to the mounting member no; characterized by a second width less than the exposed width of the grid segment; configured to align with the assembly of grid segments while the first magnet 122 and the second magnet 124 are magnetically coupled to the assembly of grid segments; configured to adhere to the assembly of grid segments while the first magnet 122 and the second magnet 124 are magnetically coupled to the assembly of grid segments; and configured to detach from the upper face 112 and remain adhered to the assembly of grid segments in response to vertical displacement of the upper face 112 away from the assembly of grid segments.

1.1 Mounting Kit

A mounting kit for repeatably mounting an image sensor to a grid ceiling including a set of ceiling tiles supported by an assembly of grid segments, includes the mounting system 100 and a set of adapters including a drywall adapter, a non-tegular adapter, and/or a fixture adapter configured to connect to the image sensor.

1.2 Applications

Generally, a mounting system (hereinafter "the system 100"), shown in FIG. 1, enables a user to securely and repeatably mount sensors (e.g., image sensor), lighting elements, or other ceiling fixtures to a grid ceiling (i.e. a suspended ceiling, dropped ceiling, T-bar ceiling, or false ceiling) via magnetic coupling to a ferromagnetic grid of the grid ceiling while also facilitating replacement, by a user, of these ceiling fixtures in the same position relative to the grid ceiling after detachment of the system 100 from the grid ceiling—all without requiring the use of tools to remove or attach the system 100 from the grid ceiling. More specifically, the system 100 includes a mounting member no, a set of magnets 120 affixed to an upper face 112 of the mounting member no, and a set of registration features 130 arranged on the upper face 112 of the mounting member no that are configured to fit between tegular ceiling panels of the grid ceiling. Because of the system's magnetic attachment mechanism to the grid ceiling, the system 100 can facilitate attachment, removal, and replacement of ceiling fixtures to and from grid ceilings without necessitating access to the space above the grid ceiling (e.g., via removal of ceiling panels) and without the use of tools such as screwdrivers, wrenches, etc. Thus, the system 100 can enable battery replacement (e.g., for smoke and carbon dioxide detectors, battery powered lighting ceiling fixtures, passive infrared sensors, visual sensors), replacement of expired lighting elements or other components, and/or other general maintenance for ceiling fixtures installed on the grid ceiling.

Additionally, the system 100 can enable precise replacement of these ceiling fixtures, via the arrangement of the set of magnets 120 on the mounting member 110 and the arrangement of the registration feature 130 on the upper face 112 of the mounting member no, by causing interference between these features of the system 100 and tegular ceiling panels of the grid ceiling when the system 100 is not positioned correctly relative to an intersection or segment of the grid ceiling. Thus, as a user replaces the system 100 and an attached ceiling fixture onto the grid ceiling, the system 100 guides the user to reposition the system 100 in the same position from which it was removed (assuming placement proximal to the same grid intersection or segment).

In one example application of the system 100, a set of image sensors must be arranged on a grid ceiling such that the field of view of each sensor minimally overlaps with the fields of view of its neighboring sensors, the precise placement of each sensor in the grid ceiling may be pre-mapped or otherwise predetermined. Therefore, precise post-maintenance replacement of each sensor to its prior position relative to the grid ceiling can maintain full coverage over a workspace for this set of optical sensors as these optical sensors are serviced over time. The system 100 can therefore enable users to effectively perform maintenance tasks on sets of passive infrared sensors, optical sensors, or other sensors that require precise positioning on the grid ceiling as well as frequent maintenance.

The system 100 can be integrated directly with a ceiling fixture to enable direct mounting of the ceiling fixture to the grid ceiling. Alternatively, a single instance of the system 100 can be configured to mount multiple types of fixtures by interfacing with a set of fixture adapters via a set of attachment features such as brackets, through-holes, threaded bores, etc. Furthermore, a single instance of the system 100 can be configured to mount to multiple types of grid ceilings or other types of ceiling by interfacing with a set of ceiling adapters. Thus, in some implementations, the system 100 can be configured to attach multiple types of ceiling fixtures to multiple types of ceilings.

In one variation of the system 100, shown in FIG. 9, the system 100 includes a detachable registration feature 132 that, in addition to facilitating alignment of the system 100 with the grid ceiling, also strongly adheres to the grid ceiling such that, when a user removes the system 100 from the grid ceiling, the detachable registration feature 132 detaches from the mounting member no and remains attached to the grid ceiling. Thus, when the user proceeds to replace the mounting member no and attached ceiling fixture to the ceiling, the detachable registration feature 132 can guide the user to position the mounting member no at a repeatable location and orientation (i.e., within 0.5 cm and within 3.0 degrees of the original location and orientation of the system 100 relative to the grid ceiling) and physically constrain the rotation and translation of the system 100 while the mounting member no is magnetically coupled to the grid ceiling.

Generally, the system 100 is described herein with reference to a "grid ceiling" including an assembly of grid segments (e.g., ferromagnetic T-bar segments) and a set of tegular panels supported by the assembly of grid segments. However, variations of the system 100 can repeatably (e.g., to within 0.5 cm translation and 3.0 degrees of rotation) attach to other types of grid ceilings (e.g., non-tegular grid ceilings) and/or to other ferromagnetic surfaces that are vertical, horizontal, or inclined.

1.3 Mounting Member

Generally, the system 100 includes a mounting member no, which functions as the primary structural element of the system 100. More specifically, the mounting member no defines: an upper face 112 defining the registration features 130 or to which the detachable registration feature is transiently coupled, and to which the set of magnets 120 are coupled; and a lower face 114 which can include brackets, through-holes, or other attachment mechanisms configured to attach a ceiling fixture or adapter to the system 100 in order to attach these ceiling fixtures to the grid ceiling.

The mounting member no can be manufactured from a structurally rigid material sufficient to support the weight of a ceiling fixture for attachment to the ceiling grid such as a formed sheet metal, milled metal, molded metal, or hard plastic. However, the system 100 can include a mounting member no including any type of material that can support the gravitational force of the ceiling fixture without significant deformation or degradation as the system 100 hangs from the set of magnets 120 that can be magnetically coupled with the ceiling grid.

The mounting member no can define an upper face 112 that sits substantially parallel to the grid ceiling while the system 100 is magnetically coupled to the grid ceiling enabling engagement of registration features 130 arranged on this surface with corresponding features of the grid ceiling (e.g., exposed sections of the ceiling grid between tegular panels of the grid ceiling). In one implementation, the mounting member no itself defines the registration features 130 as ridges or extrusions of the upper face 112 of the mounting member 110. Alternatively, the mounting member 110 can define attachment points to enable attachment of the registration feature 130 to the upper face 112 of the mounting member no.

In one implementation, the mounting member no can include visual indicators (e.g., in the form of colored symbols or an asymmetrical shape) to indicate to a user the rotational orientation of the system 100, thereby facilitating accurate placement of the system 100 onto the grid ceiling.

1.4 Magnets

Generally, the system 100 includes a set of magnets 120 (e.g., permanent magnets) fixed to the upper face 112 of the mounting member no that are characterized by a magnetic field strength sufficient to secure the weight of the system 100 and an attached ceiling fixture to the grid ceiling via the attractive force generated by the set of magnets' 120 proximity to the ferromagnetic grid of the grid ceiling. More specifically, the system 100 can include a set of magnets 120 fixed to the upper face 112 of the mounting member no in an arrangement that aligns the set of magnets 120 with a recurring arrangement of the assembly of grid segments of the ceiling grid, wherein each magnet in the set of magnets 120 is characterized by a height greater than a protrusion distance of tegular panels (e.g., ceiling tiles) of the grid ceiling below the grid of the grid ceiling and characterized by a width less than an exposed width of the grid segments of the grid ceiling. Thus, while the set of magnets 120 are magnetically coupled to the grid segments of the grid ceiling, the upper face 112 of the mounting member 110 is positioned below the greatest downward extent of the tegular panels of the grid ceiling below the outer surface of the assembly of grid segments (with the exception of any registration features 130 integrated with the mounting member 110). Additionally, the system 100 includes magnets of a width less than the exposed width of each grid segment in the grid ceiling to prevent physical interference of the magnets with the tegular panels of the grid ceiling when the magnets are aligned with the assembly of grid segments.

For example, the system 100 can include a set of two inline magnets configured to magnetically couple along a grid segment in the assembly of grid segments. In another example, the system 100 can include a set of three magnets, two inline and one offset from the two inline magnets, configured to magnetically couple to two intersecting grid segments. Further variations in the number of magnets included in the set of magnets 120 and the arrangement of these magnets on the upper face 112 of the mounting member no are further described below.

In one implementation, the set of magnets 120 includes a set of permanent magnets such as rare-earth neodymium magnets in order to increase the strength of the magnetic field produced by these magnets and, therefore, increasing the weight that can be supported by the system 100. However, the system 100 can also include other types of permanent magnets such as those manufactured from other ferromagnetic materials such as alloys of iron, nickel, cobalt, etc. Additionally, the magnets can be coated or covered with a thin layer of a soft material (e.g., rubber, plastic, silicone) to prevent pinching of a user's fingers between a magnet and the grid of the grid ceiling (or any other ferromagnetic object) during installation of the system 100.

The system 100 can include a set of magnets 120 that are securely attached to the mounting member no via fasteners, such as nuts and bolts, via integrated retaining flanges (where each magnet is retained under a retaining structure, via co-molding of the set of magnets 120 with the mounting member no, or via heat staking of the set of magnets 120 to the mounting member 110. The attachment between the set of magnets 120 and the mounting member no can withstand forces greater than the attraction force between the set of magnets 120 and the grid of the grid ceiling in order to enable separation of the system 100 from the grid ceiling without separating the mounting member no from the set of magnets 120. Therefore, each magnet in the set of magnets 120 is configured to interface with the attachment mechanisms for the magnets, thereby securing each magnet to the upper face 112 of the mounting member no. For example, the system 100 can include a nut and screw fastening mechanism to attach the set of magnets 120 to the mounting member no and, in this example, the system 100 can include a set of magnets 120 defining a countersunk hole through the center of each magnet configured to interface with the head of the screw, thereby enabling the screw to pass through the center of the magnet and the mounting member no. Each magnet can then be fastened to the mounting member no via attachment of a nut to the screw via the underside of the mounting member no.

The system 100 can include a set of magnets 120 defining a shape configured to fit between tegular panels of the grid ceiling. Therefore, the system 100 can include a variety of magnet shapes. In one implementation, the system 100 includes a set of magnets 120 defining a cylindrical shape in order to reduce the manufacturing cost of the system 100 because this magnet shape is the most commonly available. In another implementation, the system 100 includes a set of magnets 120 defining an annular ring shape to facilitate attachment of the set of magnets 120 to the mounting member no. Additionally or alternatively, the system 100 can include a set of magnets 120 that define a rectangular horizontal cross-section, where one side of the width of the rectangular cross section is less than the width of the exposed grid between tegular panels of the grid ceiling. These magnets that define a rectangular horizontal cross-section can also include through-holes or countersinks to enable attachment of the set of magnets 120 to the mounting member 110. However, the system 100 can include magnets defining any other shape that can fit between tegular panels of the grid ceiling.

The system 100 can also include a set of magnets 120 that are fixed to and arranged across the upper face 112 of the mounting member 110 based on the weight distribution (e.g., the center of gravity in the horizontal plane) of the ceiling fixture configured to be attached to the system 100 and mounted to the grid ceiling. For example, the system 100 can include an arrangement of the set of magnets 120 that is rotationally symmetric about the center of gravity of the assembly of the system 100 and the attached ceiling fixture in the horizontal plane. However, the system 100 can include arrangements that deviate from this rule when the magnetic force exerted by the magnets greatly exceeds the weight of the system 100 and attached ceiling fixture.

1.5 Registration Features

Generally, the system 100 can include a set of registration features 130 arranged on the upper face 112 of the mounting member no and configured to engage or align with gaps between tegular panels of the grid ceiling in order to further aid a user in aligning the system 100 with the ceiling grid when placing the system 100 onto the grid ceiling. More specifically, the system 100 can include a registration feature 130: arranged on the upper face 112 of the mounting member no; configured to align with the grid of the grid ceiling while the set of magnets 120 is magnetically coupled to the grid of the grid ceiling; characterized by a height less than the height of the magnets; and characterized by a width less than an exposed width of the grid of the grid ceiling. Thus, the system 100 includes registration features 130 that fit between protruding tegular panels of the grid ceiling but do not come into contact with the tegular panels or the grid itself when the system 100 is correctly positioned relative to the grid of the grid ceiling and the magnets are magnetically coupled to the grid of the grid ceiling. Therefore, if a user attempts to magnetically couple the system 100 to the grid of the grid ceiling in a manner that causes the registration features 130 to interfere with the tegular panels of the grid ceiling, the user may intuit that she will need to reposition the system 100 relative to the grid in order to correctly position the system 100.

In one implementation, the set of registration features 130 are integrated with the upper face 112 of the mounting member no and are extrusions of the material of the mounting member no. Additionally or alternatively, the registration features 130 can be manufactured as separate replaceable features that can be assembled with the mounting member no to define particular offsets of the system 100 from an intersection of the grid of the grid ceiling. The particular arrangement of the set of registration features 130 on the upper face 112 of the mounting member no is further described below with respect to the variations enumerated.

1.6 Detachable Registration Feature

Generally, the system 100 can include a detachable registration feature 132 that is initially coupled to the mounting member 110 of the system 100 upon initial placement of the system 100 against the assembly of grid segments of the grid ceiling. During initial placement, the detachable registration feature 132 strongly adheres (e.g., via magnetic coupling, chemical adhesive) to the assembly of grid segments such that, upon removal of the system 100 from the ceiling, the detachable registration feature 132 decouples from the mounting member 110 and remains attached to the assembly of grid segments in the same position and orientation with which the detachable registration feature was initially placed. When a user attempts to replace the mounting member 110 and attached ceiling fixture to the grid ceiling via the set of magnets 120, the detachable registration feature 132 visually indicates the original position and orientation of the system 100 on the grid ceiling and, via inclusion of a rotationally and translationally constraining engagement surface 134 on the detachable registration feature 132 and an interlocking surface 136 on the mounting member no, the detachable registration feature 132 physically guides the mounting member no and attached ceiling fixture back into the initial position and orientation of the system 100 relative to the grid ceiling upon magnetic coupling of the set of magnets 120 with the assembly of grid segments. Thus, the system 100 can include the detachable registration feature to enable increased repeatability not limited by the slack tolerances of tegular panels spacing when resting on the assembly of grid segments.

In one implementation, the system 100 includes a detachable registration feature 132 defining an engagement surface 134 with the mounting member no that is: configured to engage with an interlocking surface 136 of the mounting member no in response to replacement of the set of magnets (e.g., the first magnet 122 and the second magnet 124) against the assembly of grid segments when the mounting member no is placed over the detachable registration feature 132; and configured to constrain an orientation and a location of the mounting member no relative to the assembly of grid segments in response to engagement with interlocking surface 136 of the mounting member no and while the set of magnets 120 are magnetically coupled to the assembly of grid segments and while the detachable registration feature 132 is adhered to the assembly of grid segments. In this implementation, the system 100 can include a detachable registration feature 132 defining an engagement surface 134 with a set of rotationally asymmetric features (e.g., slots, bores, fillets, extrusions), which engage and/or interlock with corresponding features of the interlocking surface 136 of the mounting member 110. Additionally, the system 100 can include a mounting member 110 defining a filleted or chamfered interlocking surface 136 that, when biased against a correspondingly filleted or chamfered engagement surface 134 of the detachable registration feature 132 (e.g., by the magnetic attraction between the set of magnets 120 and the assembly of grid segments) causes the mounting member no to rotate and/or translate to align with the position and orientation of the detachable registration feature 132. For example, the engagement surface 134 of the detachable registration feature 132 can define a filleted and/or chamfered L-shaped impression and the interlocking surface 136 of the mounting member no can define a matching L-shaped extrusion. Thus, when the interlocking surface 136 is bias against the engagement surface 134 the features of the two surfaces interlock to slide the mounting member no into approximately the same position and orientation (relative to the detachable registration feature 132 and the grid ceiling) into which the mounting member no was initially placed.

In another implementation, the system 100 can include a detachable registration feature 132 configured to adhere to the assembly of grid segments more strongly than the detachable registration feature 132 is initially coupled to the mounting member no. More specifically, the system 100 can include a detachable registration feature 132: transiently coupled to the mounting member 110 with a first adhesive force; and configured to adhere to the assembly of grid segments with a second adhesive force greater than the first adhesive force. Thus, when a user applies a downward force to the mounting member no or the attached ceiling fixture in order to remove the system 100 from the grid ceiling, the mounting member 110 and attached ceiling fixture detach from the detachable registration feature 132 and the detachable registration feature 132 remains adhered to assembly of grid segments.

In the aforementioned implementation, the system 100 can include a detachable registration feature 132 including a grid adhesive mechanism 138 and a mounting member coupling mechanism 140. In this example, the grid adhesive mechanism 138 is configured to adhere to the assembly of grid segments more strongly that the mounting member coupling mechanism is configured to couple to the mounting member no, thereby enabling the detachable registration feature to remain attached to the assembly of grid segments upon removal of the mounting member no from the assembly of grid segments.

In one example, the system 100 can include a detachable registration feature 132 including a magnet as the grid adhesive mechanism 138 and a weaker magnet as the mounting member coupling mechanism 140. Thus, in this example, the system 100 includes a detachable registration feature 132: magnetically coupled to the mounting member no with a first magnetic coupling force; and configured to magnetically couple to the assembly of grid segments with a second magnetic coupling force greater than the first magnetic coupling force.

In another example, the system 100 can include a detachable registration feature 132 including a non-magnetic adhesive mechanism—such as a flat surface coated in a chemical adhesive—as the grid adhesive mechanism 138 and a magnet as the mounting member coupling mechanism 140. Thus, in this example, the system 100 includes a detachable registration feature 132: magnetically coupled to the mounting member no with a magnetic coupling force; and configured to adhere to the assembly of grid segments with a non-magnetic adhesive force greater than the magnetic coupling force.

In yet another example, the system 100 can include a detachable registration feature 132 including the grid adhesive mechanism 138 and a mechanical coupling—such as latch, buckle, snap, or any other mechanical coupling—as the mounting member coupling mechanism 140. In this example, as user may operate the mechanical coupling (e.g., to disengage the latch or buckle) in order to decouple the mounting member 110 from the detachable registration feature 132. Thus, the system 100 can include a detachable registration feature: mechanically coupled to the mounting member 110; and configured to adhere to the assembly of grid segments.

In another implementation, the system 100 can include a detachable registration feature 132 that couples to the assembly of grid segments more strongly than the set of magnets 120 magnetically couple to the assembly of grid segments in order to reduce the frequency with which a user may accidentally displace or remove the detachable registration feature 132 from the assembly of grid segments while attempting to remove only the mounting member 110 and the attached ceiling fixture. Thus, the system 100 includes: the set of magnets 120 (e.g., the first magnet 122 and the second magnet 124) characterized by a combined magnetic coupling force to the assembly of grid segments; and the detachable registration feature 132 configured to adhere to the assembly of grid segments with an adhesive force greater than the combined magnetic coupling force and the adhesive force.

In yet another implementation, the detachable registration feature 132 can include a rubberized contact surface 142 in order to increase friction between the detachable registration feature 132 and the assembly of grid segments during magnetic coupling of the detachable registration feature 132 to the assembly of grid segments, thereby increasing the shear force at the upper surface of the detachable registration feature 132 required to displace the detachable registration feature 132 along the surface of the assembly of grid segments. More specifically, the system 100 can include a detachable registration feature 132 a rubberized contact surface 142, the rubberized contact surface configured to contact the assembly of grid segments while the detachable registration feature 132 is adhered to the assembly of grid segments. Thus, the rubberized contact surface 142 can prevent slippage of the detachable registration feature relative to the assembly of grid segments and ensure the repeatability in the replacement of the mounting member 110 onto the grid ceiling based on the detachable registration feature.

1.7 Magnet and Registration Feature Configurations

Generally, the system 100 can be configured in a number of variations specific to particular applications of the system 100. More specifically, each variation of the system 100 includes an arrangement of the set of magnets 120 and registration features 130 that are configured to engage with a particular position—such as a position in line with a grid segment or a position along a grid segment offset from a grid intersection—in the repeated pattern of the grid of the grid ceiling. Additionally, the system 100 can include a variable number of magnets in the set of magnets 120 to constrain the positioning of the system 100 and to vary the maximum weight that can be supported by the set of magnets 120.

Any of the variations described below can include additional magnets arranged to engage with the same grid segments of the grid ceiling as the enumerated magnets in order to provide additional magnetic force to secure the system 100 to the grid ceiling.

1.7.1 Two-Magnet In-Line Registration Variation

As shown in FIG. 1, in the two-magnet parallel registration variation of the system 100, the system 100 can include a set of two magnets and/or a registration feature 130 in-line with these two magnets. More specifically, the system 100 can include a registration feature 130 or detachable registration feature 132 aligned with a first magnet 122 and a second magnet 124 (while transiently coupled to the mounting member 110, in implementations including the detachable registration feature 132). Thus, the system 100 in this variation can be magnetically coupled along any straight segment of the grid and is constrained along this straight segment by the set of magnets 120 and/or the registration feature 130 in-line with these magnets. Therefore, this variation of the system 100 can be deployed in applications where one-dimensional translation/adjustment of the system 100 (e.g., translation along the straight segment of the grid) is desirable.

In one implementation of this variation, the system 100 includes registration feature(s) 130 arranged on either side of the two in-line magnets to aid a user in guiding the system 100 in between tegular panels of the grid ceiling in order to magnetically couple the system 100 to the grid of the grid ceiling. Alternatively, the system 100 can include a registration feature 130 between the set of two magnets in order to center the system 100 relative to the tegular panels on either side of the grid segment to which the system 100 is magnetically coupled.

1.7.2 Two-Magnet Perpendicular Registration Variation

Figure 2:
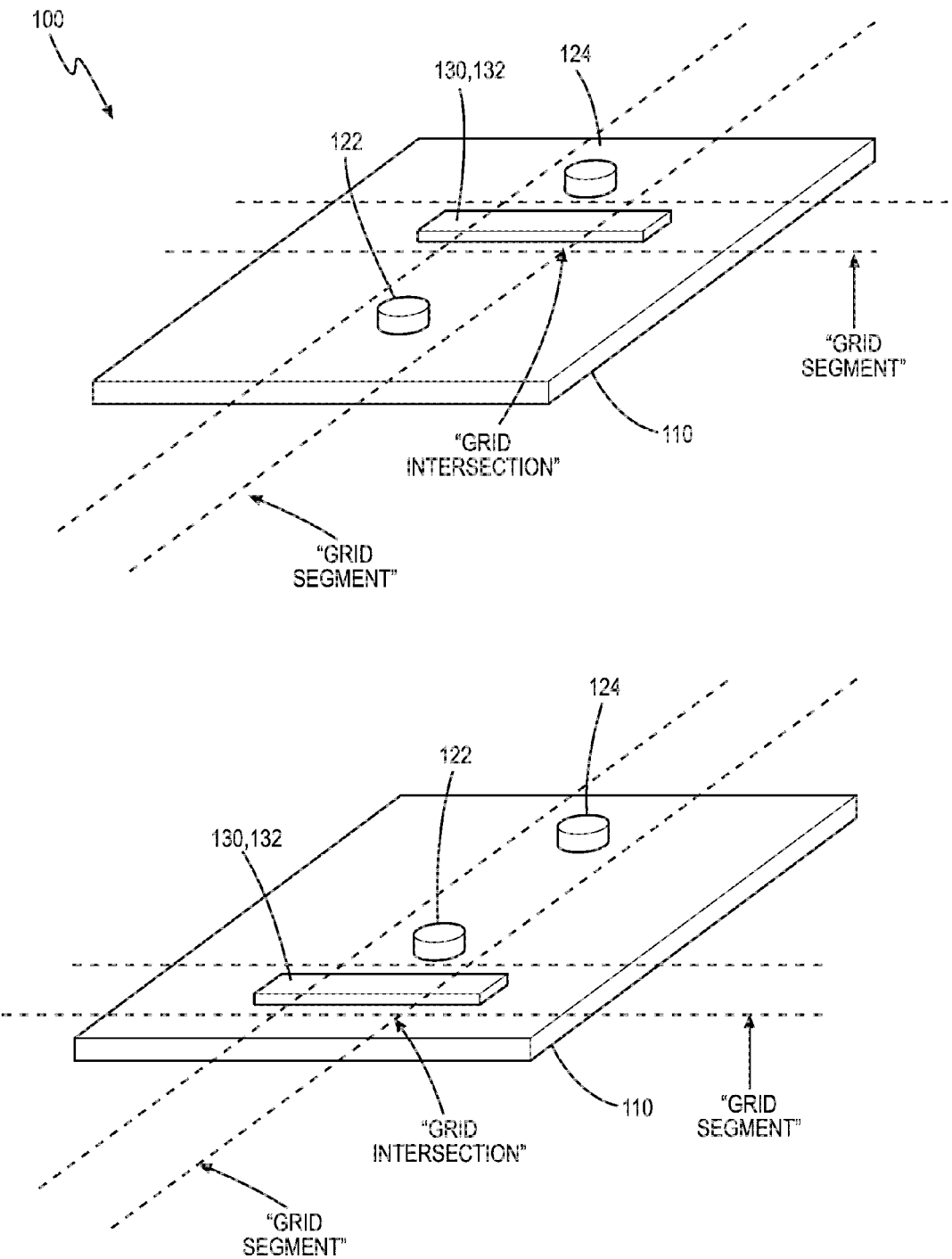
FIG. 2 is a schematic representation of one variation of the first system.

As shown in FIG. 2, in the two-magnet perpendicular registration variation, the system 100 includes a set of two magnets and a registration feature 130 arranged perpendicular to the in-line magnets. More specifically, the system 100 can include a registration feature 130 or a detachable registration feature 132 arranged perpendicular to a first magnet 122 and a second magnet 124 (while transiently coupled to the mounting member 110, in implementations including the detachable registration feature). Thus, the system 100, in this variation, can be magnetically coupled at rotationally symmetric positions about a grid intersection in the ceiling grid and is fully constrained in this position by the set of two magnets and the perpendicular registration feature 130. Therefore, this variation of the system 100 can be deployed in applications that require only 90-degree incremental rotational adjustment and the magnetic coupling force of only two-magnets.

In one implementation of this variation, the system 100 includes a registration feature 130 on either side of the two in-line magnets (and perpendicular to these magnets) to enable this registration feature 130 to fit between tegular panels on either side of the grid segment perpendicular to the grid segment to which the set of two magnets are magnetically coupled.

Alternatively, the system 100 can include a registration feature 130 between the set of two magnets and perpendicular to the in-line set of two magnets, thereby enabling the system 100 to span an intersection of the grid of the grid ceiling. More specifically, the system 100 can include a registration feature 130 or a detachable registration feature 132 perpendicular to and arranged between the first magnet 122 and the second magnet 124 while transiently coupled to the mounting member 110.

In another implementation of this variation, the system 100 can include a single registration feature laterally offset (on one side) and perpendicular to the set of two magnets. More specifically, the system 100 can include a registration feature 130 or a detachable registration feature 132 laterally offset from the first magnet 122 in a first direction and the second magnet 124 in the first direction.

1.7.2 Three-Magnet Variation

Figure 3:
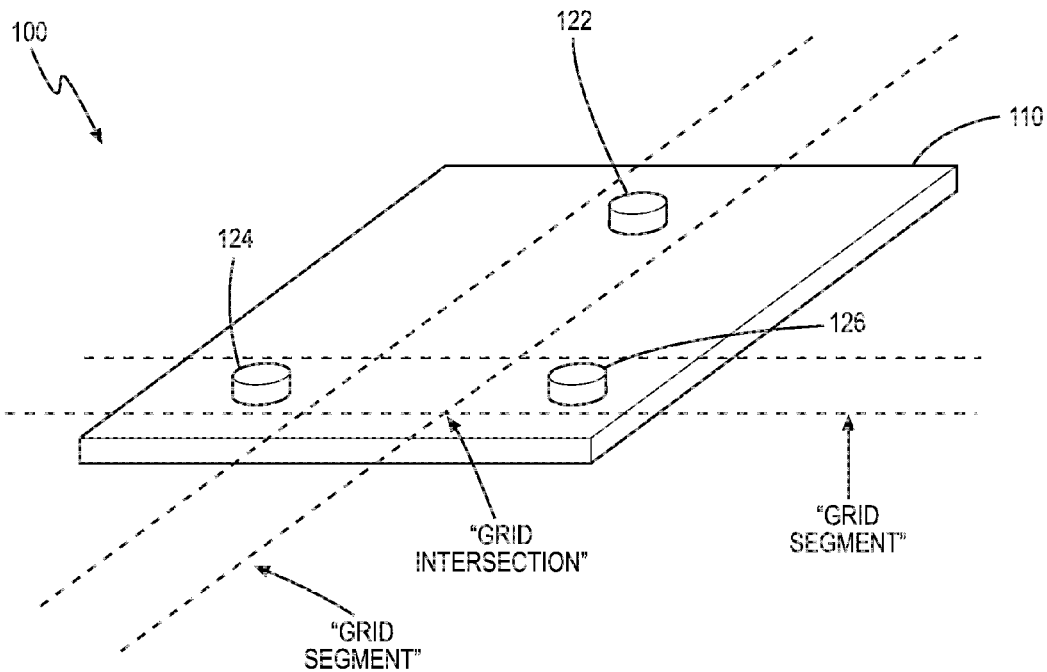
FIG. 3 is a schematic representation of one variation of the first system.
Figure 3:
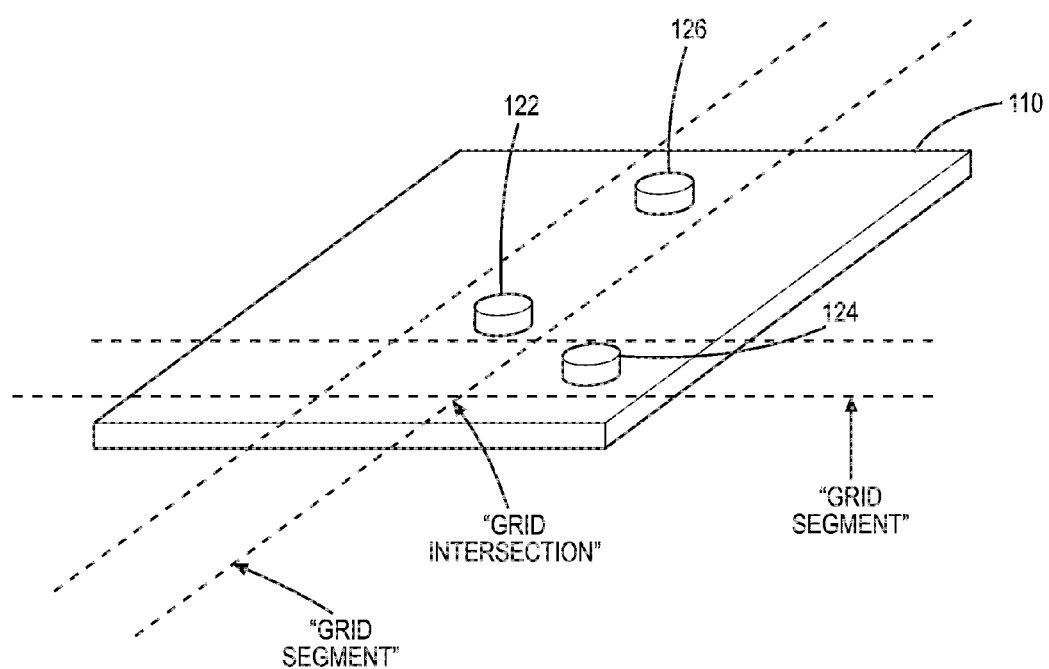

As shown in FIG. 3, in the three-magnet variation, the system 100 includes a set of three magnets. More specifically, the system 100 can include a third magnet 126 that is fixed to the upper face 112 and characterized by the same height as the first magnet 122 and the second magnet 126. Thus, the system 100 in this variation can be magnetically coupled at rotationally symmetric positions about a grid intersection in the grid of the ceiling grid and is fully constrained in this position by two of the set of three magnets magnetically coupled to a first grid segment while the third of the set of three magnets is magnetically coupled to a second perpendicular grid segment. Therefore, this variation of the system 100 can be deployed in applications that require only 90-degree incremental rotational adjustment and the magnetic coupling force of three magnets.

In one implementation of this variation, the system 100 includes two in-line magnets and one magnet offset from the line formed by the two in-line magnets and arranged in-between these two magnets in the dimension parallel with this line, thus forming an acute triangle between the set of three magnets. In this implementation, the system 100 can be magnetically coupled in a position that is more closely centered to the grid intersection in the grid ceiling.

Alternatively, the system 100 includes two in-line magnets and one magnet offset from the line formed by the two in-line magnets and arranged on either side of the two magnets in the dimension parallel with this line, thus forming an obtuse triangle between the set of three magnets. In this implementation, the system 100 can be magnetically coupled in a position offset from the intersection in the grid ceiling along a grid segment extending from this grid intersection.

1.7.4 Four-Magnet Variation

Figure 4:
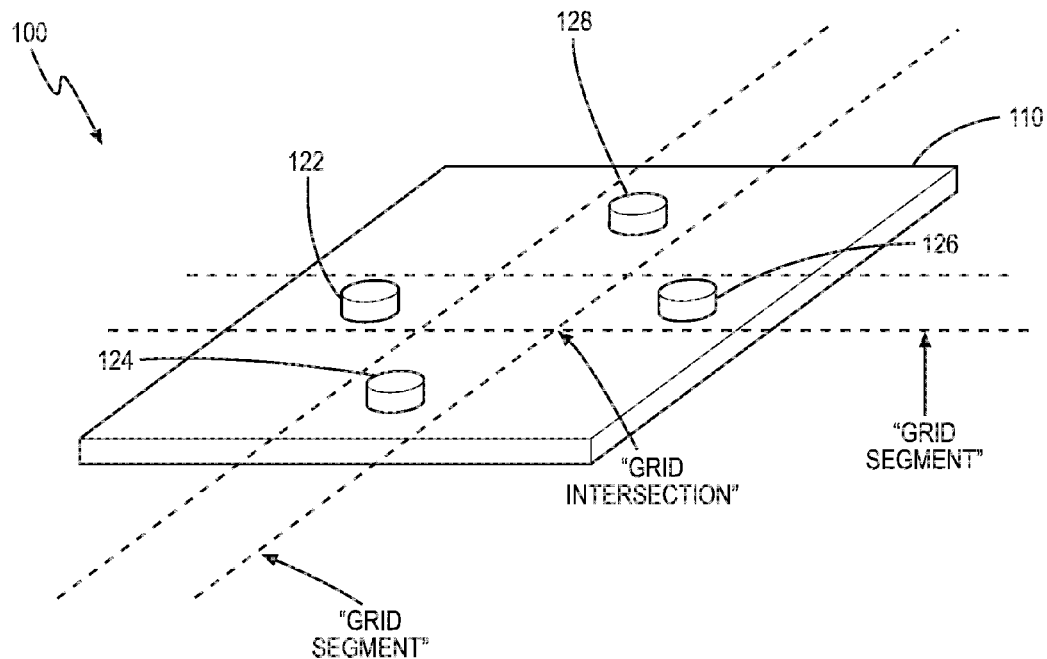
FIG. 4 is a schematic representation of one variation of the first system.
Figure 4:
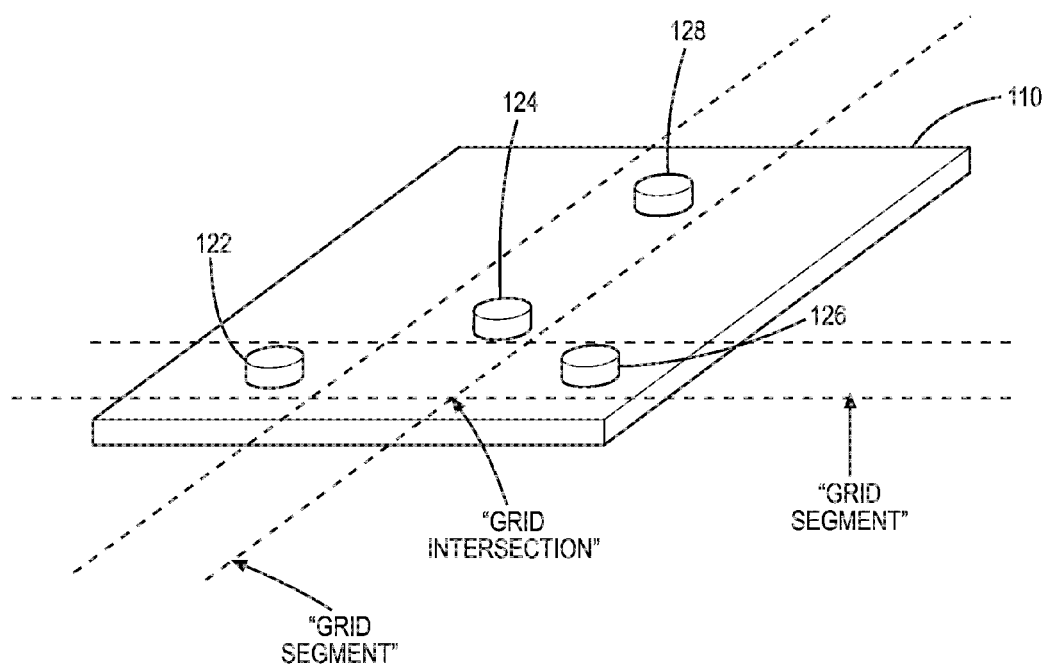

A shown in FIG. 4, in the four-magnet variation, the system 100 includes a set of four magnets arranged in a cross configuration (e.g., two sets of in-line magnets forming two perpendicular lines). More specifically, the system 100 can include: a third magnet 126 fixed to the upper surface 112 and characterized by a first height (e.g., the same height as the first magnet 122 and the second magnet 124); and a fourth magnet 128 fixed to the upper surface 112, characterized by the first height, and aligned with the third magnet 126 perpendicular to the first magnet 122 and the second magnet 124. Thus, the system 100 in this variation can be magnetically coupled at rotationally symmetric positions about a grid intersection in the ceiling grid and is fully constrained in this position by the set of four magnets, where a first set of two of the four magnets is magnetically coupled to a first grid segment and a second set of two of the four magnets is magnetically coupled to a second grid segment perpendicular to the first grid segment. Therefore, this variation of the system 100 can be deployed in applications that require only 90-degree incremental rotational adjustment and the magnetic coupling force of four magnets.

In one implementation of this variation, the system 100 includes a first set of two in-line magnets forming a first line and a second set of two in-line magnets forming a second line perpendicular to the first line where the second perpendicular line passes in-between the first set of two magnets. Thus, in this implementation, the system 100 can be centrally positioned under a grid intersection of the ceiling grid.

Alternatively, the system 100 includes a first set of two in-line magnets forming a first line and a second set of two in-line magnets forming a second line perpendicular to the first line wherein the second perpendicular line does not pass between the first set of two magnets. Thus, in this implementation, the system 100 can be positioned offset from a grid intersection of the ceiling grid.

1.8 Integrated Fixture

Figure 5:
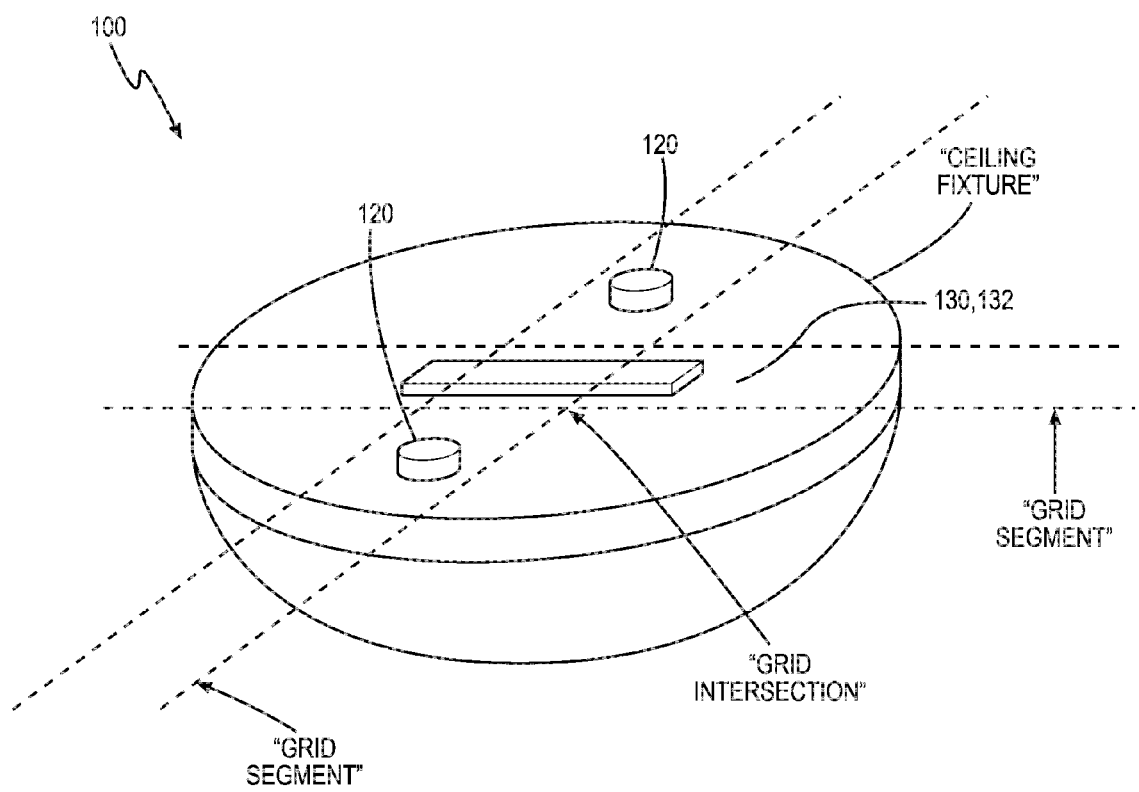
FIG. 5 is a schematic representation of one variation of the first system.

As shown in FIG. 5, in one variation, the system 100 is integrated with the attached ceiling fixture (e.g., as a component placed along the top surface of the ceiling fixture). More specifically, the system can include a mounting member 110 integrated with a chassis of the ceiling fixture. In this implementation, the system 100 includes a mounting member 110 that also acts as the chassis 116 of the ceiling fixture. For example, the system 100 can include a mounting member 110 that also functions as the top surface of the image sensor. In this implementation, the system 100 includes the set of magnets 120 and registration features 130 that are directly integrated with the upper surface of the attached ceiling fixture that is acting as the mounting member 110.

2. Mounting Kit

Figure 6:
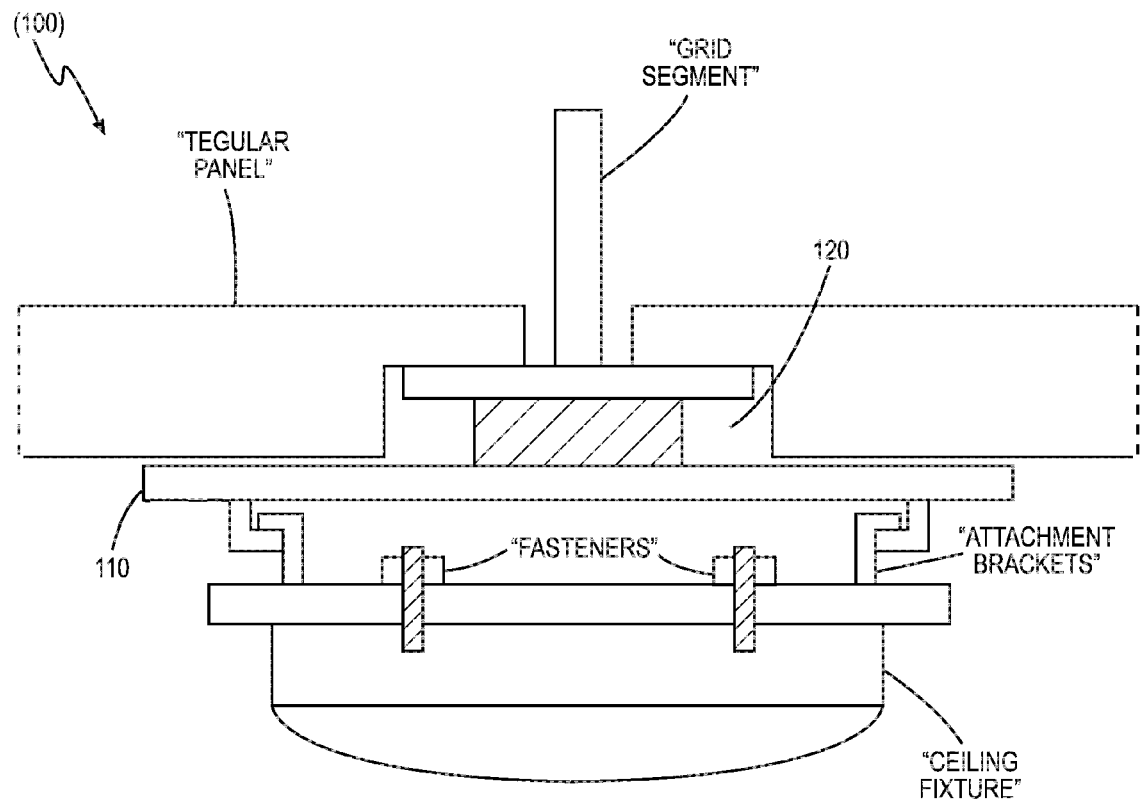
FIG. 6 is a schematic representation of one variation of the first system.
Figure 7:
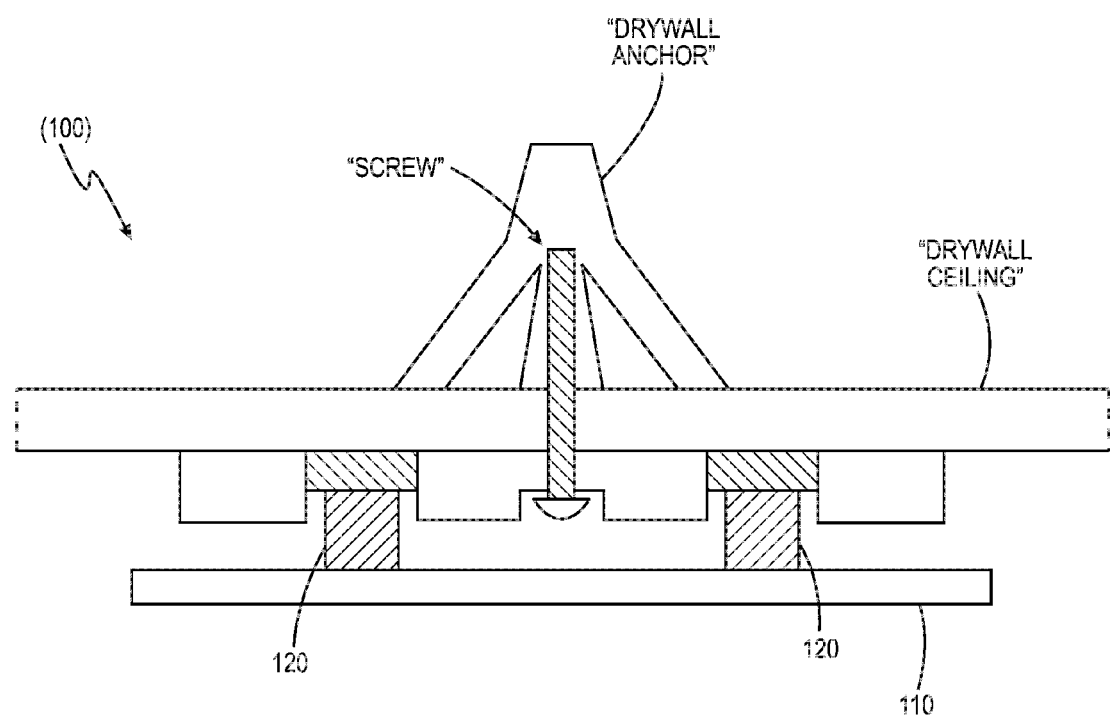
FIG. 7 is a schematic representation of one variation of the first system.
Figure 8:
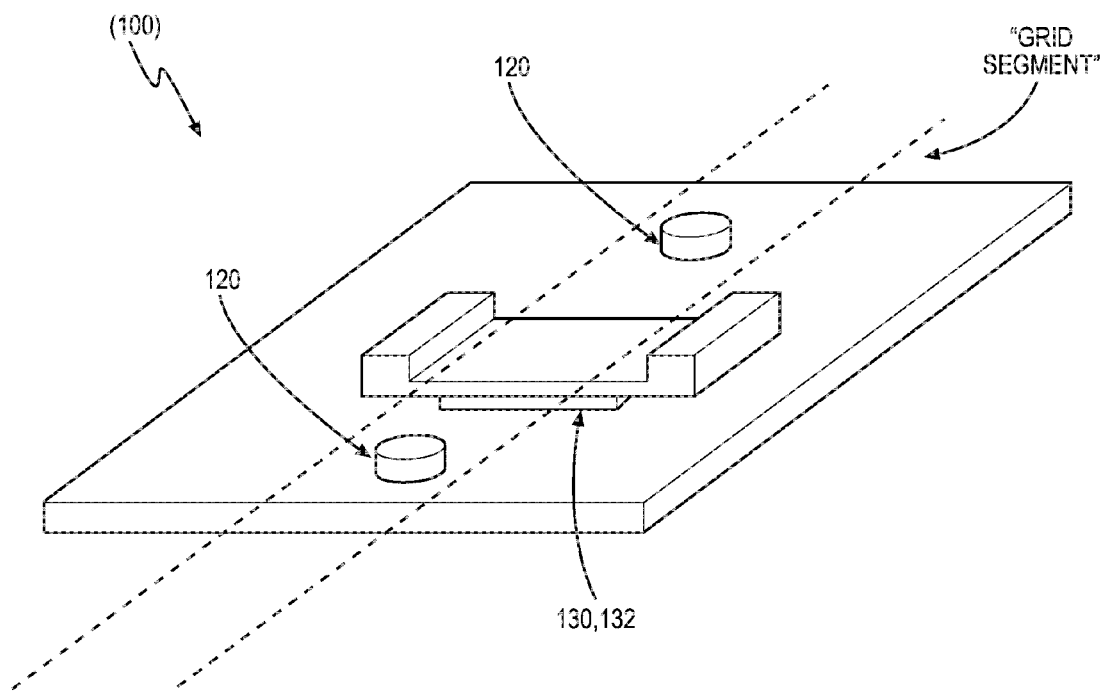
FIG. 8 is a schematic representation of one variation of the first system.

As shown in FIGS. 6, 7, and 8, a mounting kit can include the system 100 and a set of adapters that collectively enable the system 100 to securely mount to a variety of ceiling, post, wall, and/or other surfaces. More specifically, the mounting kit can include the system 100 and a set of fixture adapters, drywall adapters, non-tegular adapters, and/or other ceiling or wall adapters as described below.

2.1 Fixture Adapters

As shown in FIG. 6, the mounting kit can include an adapter or set of adapters, where each adapter is configured to attach to a particular type of ceiling, post, wall, and/or other surfaces. For example, each adapter can include: an adapter member configured to attach to the ceiling fixture at its upper face 112; and a mounting member 110 configured to locate an instance of the system 100 at its lower surface. The adapter member can include mounting brackets, through-holes, countersunk and/or threaded holes, mechanical clips, adhesives, studs (e.g., screws), clearances for attaching to the ceiling fixture via cable ties, or any other attachment mechanism that enables a single mounting member 110 geometry to install on many types of ceiling surfaces. Thus, mounting kit can include a fixture adapter: configured to attach to the mounting member 110 of the system 100; and configured to attach to a chassis of the image sensor.

2.2 Ceiling Adapters

Generally, as shown in FIG. 7, the mounting kit can also include a ceiling adapter, or a set of ceiling adapters configured to enable the system 100 to attach to other types of ceilings—such as non-tegular grid ceilings or ceilings that do not include a ferromagnetic grid such as drywall ceilings. More specifically, the mounting kit can include ceiling adapters that further include ferromagnetic elements that are aligned with the arrangement of the set of magnets 120. Additionally, the mounting kit can include a ceiling adapter that includes corresponding features to the registration features 130 of the system 100. Furthermore, the mounting kit can include a ceiling adapter that includes another suitable attachment method to attach the system 100 to a particular type of ceiling. Thus, in this implementation, the system 100 is configured to attach via magnetic coupling of the set of magnets 120 to ferromagnetic features of the ceiling adapter arranged proximal to the lower surface of the ceiling adapter. The ceiling adapter includes a set of mounting features arranged about its upper surface configured to mount to a specific type of ceiling, such as a non-tegular grid ceiling or a drywall ceiling.

In one example, the mounting kit includes a drywall ceiling adapter configured to attach to a drywall ceiling via attachment to a specific ceiling mounted drywall anchor. More specifically, the mounting kit can include a drywall ceiling adapter: configured to attach to a drywall ceiling; including a first ferromagnetic element configured to engage with the first magnet 122; and including a second ferromagnetic element configured to engage with the second magnet 124.

As shown in FIG. 8, mounting kit can include a ceiling adapter for mounting to non-tegular grid ceiling (i.e., grid ceilings where the ceiling panels are recessed above the lower surface defined by the grid). In this implementation, instead of including a ceiling adapter that attaches to the system 100 via magnetic coupling with the set of magnets 120, this non-tegular adapter can secure to the upper surface of the registration features 130 (e.g., via threaded holes on the upper surface of the registration features 130) and can define a U-shaped bracket with an internal width greater than the width of the grid segments of the grid ceiling.

Additionally, the system 100 can include registration features 130 modified by the non-tegular adapter, which is configured to aid a user in placing the system 100 such that it aligns with the T-bars extending below the recessed panels of the non-tegular grid ceiling. Thus, the mounting kit can include a non-tegular adapter: defining a bracket characterized by an internal width greater than a width of a non-tegular grid segment in the assembly of grid segments; and configured to engage with the non-tegular grid segment while the first magnet 122 and the second magnet 124 are magnetically coupled to the assembly of grid segments; and configured to constrain an orientation and a location of the mounting member 110 relative to the assembly of grid segments in response to engagement with the non-tegular grid segment and while the first magnet 122 and the second magnet 124 are magnetically coupled to the assembly of grid segments.

However, the system 100 can include a ceiling adapter configured to attach to any type of ceiling.

3. Second System

Figure 11:
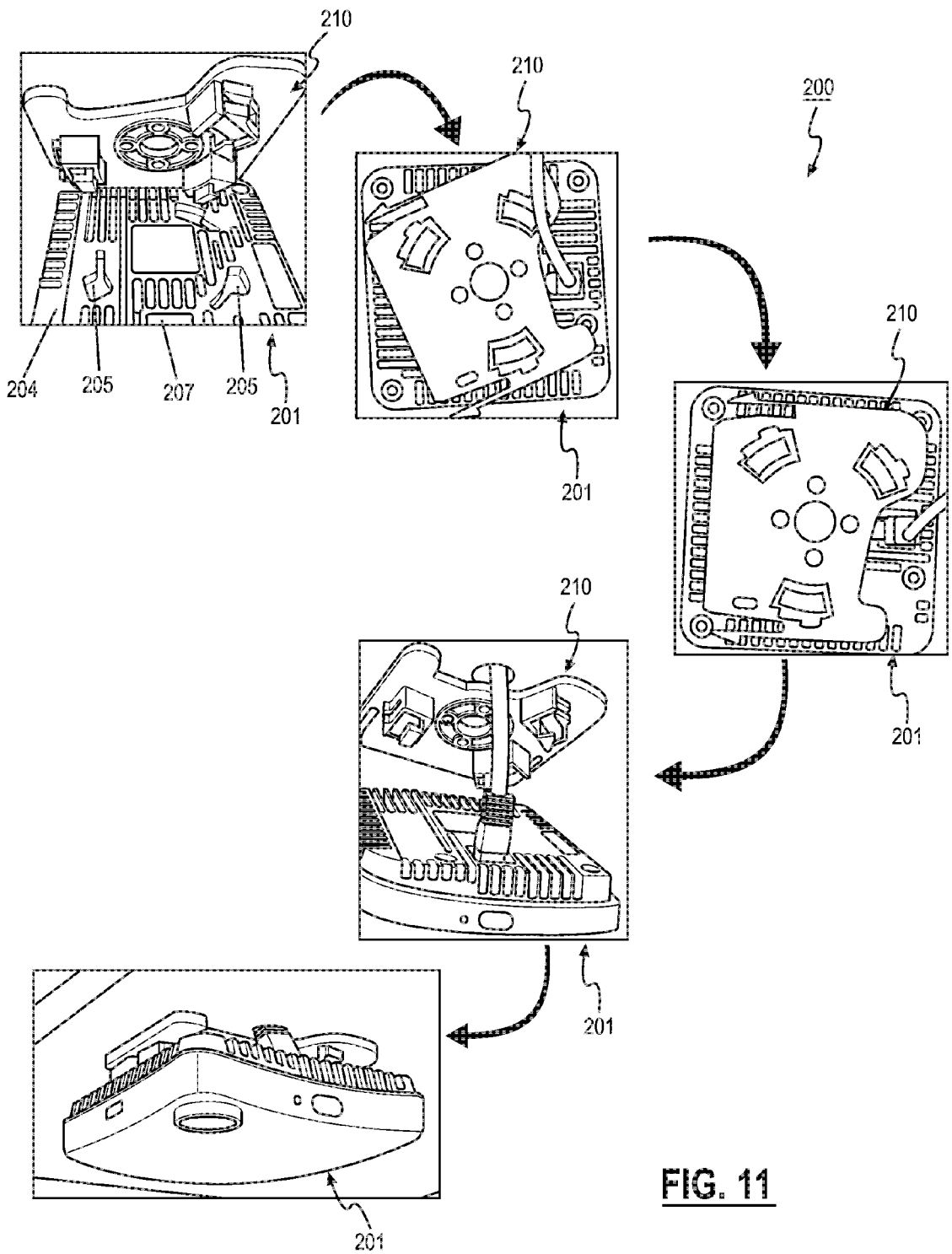
FIG. 11 is a schematic representation of one variation of the second system.

As shown in FIG. 11, a second system 200 for mounting an image sensor 206 to a ceiling surface includes: a sensor block 201; and a kit of mounts.

The sensor block 201 includes: a housing 202; an image sensor 206; and a receptacle 207. The housing 202 defines a front face 203; a rear face 204 opposite the front face 203 and defining a set of engagement features 205. The image sensor 206: is arranged in the housing 202; and faces outwardly from the front face 203 of the housing 202. The receptacle 207: is arranged on the rear face 204 of the housing 202; and is configured to receive an electrical cable.

The kit of mounts includes a universal bracket 210, a junction mount 222, and a wall mount 230.

The universal bracket 210 includes: a first mounting plate 211 defining a) a cutaway feature 212 arranged on an edge of the universal bracket 210 and configured to pass the electrical cable to the receptacle 207 and b) a set of latches 213; a first mounting bore 214 configured to receive a mounting rod suspended from the ceiling surface; a first set of through-holes 215 arranged about the first mounting bore 214 and configured to receive a set of fasteners 234 to mount the universal bracket 210 to the ceiling surface; a first set of standoffs 216 extending below the first mounting plate 211, arranged about the first mounting bore 214, and configured to offset the rear face 204 of the housing 202 below the first mounting plate 211; and a first set of retention features 217 arranged on the set of standoffs and configured to transiently engage and retain the engagement features 205 of the housing 202.

The junction mount 222 includes: a second mounting plate 223 defining a set of latch retainers 224 configured to receive and retain the set of latches 213 of the universal bracket 210; a second set of through-holes 215 arranged about the set of latch retainers 224 and configured to couple the junction mount 222 to an electrical junction box; and a port 226 configured to pass the electrical cable to the receptacle 207.

Figure 12:
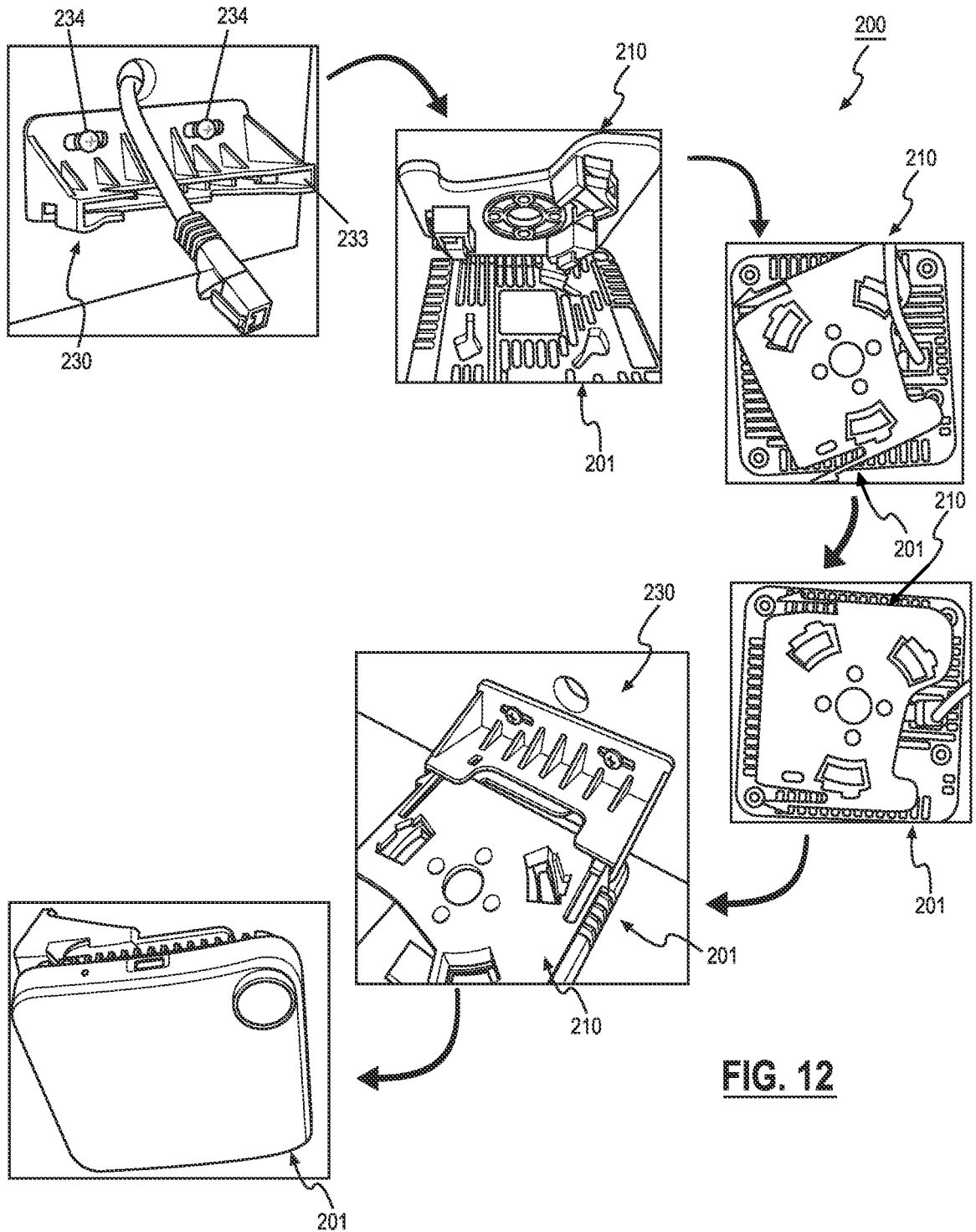
FIG. 12 is a schematic representation of one variation of the second system.

As shown in FIG. 12, one variation of the second system 200 includes: a housing 202 defining a front face 203; and a rear face 204 opposite the front face 203 and defining a set of engagement features 205. The second system 200 also includes an image sensor 206: arranged in the housing 202; facing outwardly from the front face 203 of the housing 202; a receptacle 207 arranged on the rear face 204 of the housing 202; and configured to receive an electrical cable. The second system 200 additionally includes a kit of mounts including a universal bracket 210, a junction mount 222, and a wall mount 230. The second system 200 further includes the universal bracket 210 defining a first mounting plate 211 including: a cutaway feature 212 arranged on an edge of the universal bracket 210 and configured to pass the electrical cable to the receptacle 207; a set of latches 213; a first mounting bore 214 configured to receive a mounting rod suspended from the ceiling surface; a first set of through-holes 215 arranged about the first mounting bore 214 and configured to receive a set of fasteners 234 to mount the universal bracket 210 to the ceiling surface; a first set of standoffs 216 extending below the first mounting plate 211, arranged about the first mounting bore 214, and configured to offset the rear face 204 of the housing 202 below the first mounting plate 211; and a first set of retention features 217 arranged on the set of standoffs and configured to transiently engage and retain the engagement features 205 of the housing 202.

The junction mount 222 includes a second mounting plate 223 defining: a set of latch retainers 224 configured to receive and retain the set of latches 213 of the universal bracket 210; a second set of through-holes 215 arranged about the set of latch retainers 224 and configured to couple the junction mount 222 to an electrical junction box; and a port 226 configured to pass the electrical cable to the receptacle 207.

In one variation, the second system 200 further includes a wall mount 230 defining: a bracket section 231 defining a third set of through-bores configured to receive the set of fasteners to mount the wall mount 230 to a vertical wall surface; and a second latch retainer 233 cantilevered from the bracket section 231 configured to receive and retain the set of latches 213 of the universal bracket 210; and a set of fasteners 234.

Figure 10:
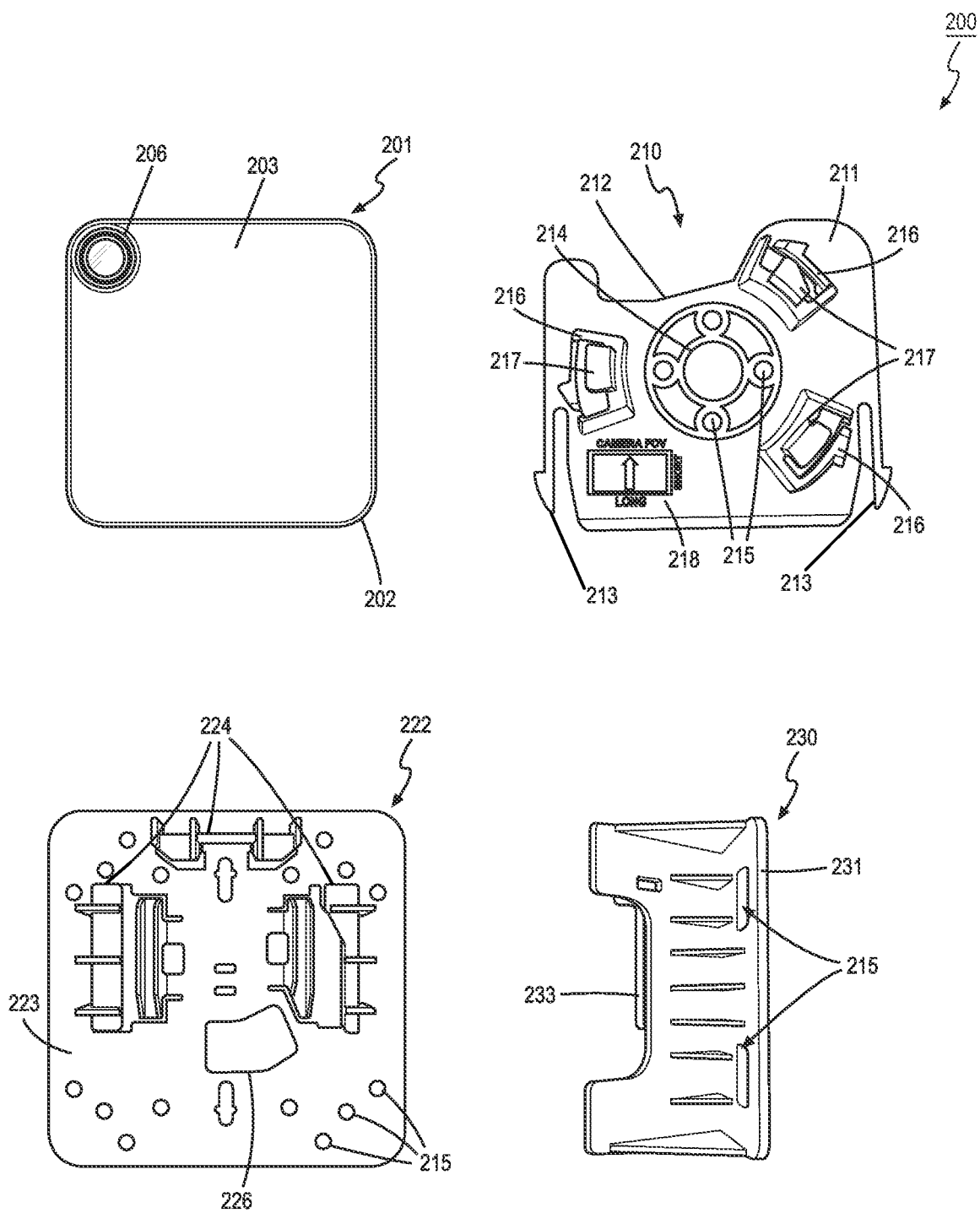
FIG. 10 is a schematic representation of a second system.

In another variation shown in FIG. 10, the universal bracket 210, the junction mount 222, and the wall mount 230 form a kit of mounts for repeatably mounting the sensor block 201 to a surface.

3.1 Applications

Generally, the second system 200 includes a kit of mounts containing a universal bracket 210, a junction mount 222, a wall mount 230, and/or a set of fasteners 234 that cooperate to enable a user to quickly and repeatedly mount a sensor block 201 (e.g., an image sensor 206): to a ceiling surface (e.g., a suspended ceiling, dropped ceiling, T-bar ceiling, gypsum board (or "drywall") ceiling, open ceiling, or false ceiling); to a wall surface; and/or to a hanging rod or post.

The sensor block 201 is paired with the kit of mounts that: includes a limited quantity of (e.g., three) components configured to install individually or in combination on a variety of vertical wall surfaces, ceiling surfaces, electrical junction boxes, hanging rods, posts, and/or other surface types; and enables the sensor block 201 to simply and repeatably install on such surfaces.

In one implementation, the kit of mounts includes the universal bracket 210, the junction mount 222, and the wall mount 230. The universal bracket 210 can be mounted directly to a ceiling surface with threaded fasteners or fastened directly to a threaded rod suspended from a ceiling surface. The sensor block 201 can then install onto the universal bracket 210—without the use of tools—by: aligning the engagement features 205 of the sensor block 201 with the retention features of the universal bracket 210; inserting the retention features of the universal bracket 210 into the engagement features 205 of the sensor block 201; and rotating the sensor block 201 on the universal bracket 210 such that retention features seat in undercut sections of engagement features 205 to retain the sensor block 201 on the universal bracket 210.

Alternatively, in this implementation, the junction mount 222 can be installed directly over (and thus enclosing) an electrical junction box previously installed on a ceiling. The sensor block 201 can be installed on the universal bracket 210 as described above. The universal bracket 210 can then install onto the junction mount 222—without the use of tools—by rotating the universal bracket 210 and the sensor block 201 onto the junction mount 222. More specifically, the junction mount 222 enables the sensor block 201—arranged on the universal bracket 210—to mount to a pre-installed electrical junction box attached to a ceiling surface. In particular, the junction mount 222 can be mounted to the electrical junction box with a set of fasteners 234. The universal bracket 210 can then be inserted into the junction mount 222—without the use of tools—by inserting the set of latches 213 of the universal bracket 210 into the set of latch retainers 224 of the junction mount 222 and rotating the universal bracket 210 on the junction mount 222.

Alternatively, in this implementation, the wall mount 230 can be installed directly onto a vertical wall surface with threaded fasteners. The sensor block 201 can be installed on the universal bracket 210 as described above. The universal bracket 210 can then install onto the wall mount 230—without the use of tools—by inserting a leading edge of the universal bracket 210 into the latch retainer of the wall mount 230. More specifically, the wall mount 230 is configured to attach to a vertical wall surface and to locate the sensor block 201—when installed on the wall mount 230—within an angular offset range (e.g., 75 degrees to 85 degrees) from the wall surface, thereby: angling the field of view of the image sensor 206 of the sensor block 201 away from the wall and toward a nearby space (e.g., an office space, or a workspace); locating an edge of the field of view of the image sensor near a junction of the wall and the floor surface below; decreasing a proportion of the field of view of the image sensor facing the wall; and increasing the information density of images captured by the image sensor. More specifically, the wall mount 230 can locate the sensor block 201 within the angular offset from the wall in order to: increase the proportion of the field of view of the image sensor intersecting the space; decrease the proportion of the field of view of the image sensor intersecting the adjacent wall (e.g., from approximately 50% to less than 5%); and thus enable the image sensor to capture objects present and moving through a larger region of the floor space below.

Therefore, an individual mount or a subset of mounts in the kit of mounts can be installed on one of various surface types within a space, and the sensor block 201 can be installed on this mount(s) without the use of tools. Furthermore, the mount(s) can remain in place when the sensor block 201 is later removed from the mount(s), such as for servicing (e.g., battery replacement) or exchanged with a new sensor block 201. More specifically, the engagement features of each mount and the sensor block 201 can thus cooperate to accurately and repeatably locate the sensor block 201 to the same position (e.g., within 0.5 degree angular tolerance in yaw orientation) when the sensor block 201 is removed, serviced, and returned to the mount. Similarly, the engagement features in each mount and the sensor block 201 can cooperate to accurately and repeatably locate a new sensor block 201 to the same position and orientation—in six degrees of freedom—when a previous sensor block 201 is removed from the mount and replaced with the new sensor block 201 of the same or similar mounting geometry. Therefore, the kit of mounts and the sensor block 201 can cooperate to accurately and repeatably (re) locate the sensor block 201 to the same or similar positions, thereby reducing or eliminating reconfiguration and recalculation of an image stitching map or mesh to combine images or object constellations from a cluster of adjacent sensor blocks when a single sensor block 201 in this cluster is removed and returned to its mount after servicing or replaced with a new sensor block 201.

3.2 Example

As described in U.S. patent application Ser. No. 16/191,115, a computer system can receive a digital office floorplan representing a designated office space and automatically extract relevant features—such as the foregoing characteristics—from the digital office floorplan.

For example, the computer system can detect walls, cubicle walls, desk locations, seat locations, conference tables, or any other feature of the office space. The computer system can then identify, from these extracted features, areas of interest of the office floorplan, such as: conference rooms; cubicle areas; open desk areas; recreational areas; a lobby; a kitchen; private offices; and/or bathrooms; etc. Additionally or alternatively, the computer system can interface with a user—via a user portal—to define areas of interest in the office floorplan.

The computer system can generate target locations for installation of sensor blocks 201 over the office floorspace based on these areas of interest and various other parameters, such as: a ceiling height over the floorspace, which may impact effective working distance for image sensors 206 in installed sensor blocks 201; various optical parameters of image sensors 206 in these sensor blocks 201, which may affect fields of view of these image sensors 206 as a function of working distance; and a target minimum overlap between fields of view of image sensors 206 in adjacent sensor blocks 201, which may affect the computer system's ability to accurately combine discrete images from these sensor blocks 201 into a composite image of the floorspace; etc.

The computer system can therefore leverage existing data, such as an office floorplan representing the designated office floorspace, to generate a plan that includes a set of target locations for the installation of sensor blocks 201 over the office floorspace, such as prior to arrival of an installer at the designated floor, and serve this plan to an installer in order to guide the installer in placing sensor blocks 201 in various target locations to achieve the specified minimum overlap and to fully encompass the designated areas of interest in the floorspace. For example, the computer system can serve the office floorplan annotated with sensor block 201 target locations (e.g., ceiling surfaces, wall surfaces, hanging rods, posts) to the installer. In another example, the computer system can serve target latitudinal and longitudinal locations of each sensor block 201 to the installer in series, such as through an installer portal accessible through a web browser or native application executing on the installer's mobile computing device. Furthermore, the computer system can generate target orientations for the sensor blocks 201 and, likewise, serve the target orientations in association with the target locations to the installer.

When the sensor blocks are deployed to the office space for installation, the installer may install sensor blocks 201 according to these target locations. However, the description of the office space, the floorplan, and other data that the controller leveraged to calculate these target locations may fail to represent accessibility and surface types of these target locations. Therefore, each sensor block 201 may be paired with a kit of mounts, and the installer may select an individual mount or a subset of mounts to install a sensor block 201 near each target location based on accessibility and surface characteristics.

For example, for a target location including a solid ceiling surface, the installer may: install a universal bracket 210 directly on this solid ceiling surface with a set of fasteners 234; bore a hole into the ceiling surface near the cutaway feature 212 of the universal bracket 210; pull an electrical (e.g., power and data) cable behind the ceiling and through this hole; connect the electrical cable to a receptacle 207 on the sensor block 201; and then install the sensor block 201 onto the universal bracket 210, as shown in FIG. 11.

In another example, for a target location including a vertical wall surface, the installer may: install the wall mount 230 directly on this vertical wall surface with a set of fasteners 234; install the sensor block 201 onto the universal bracket 210; bore a hole into the vertical wall surface above the wall mount 230; pull an electrical (e.g., power and data) cable behind the vertical wall surface and through this hole; route the electrical cable around the cutaway feature 212 of the universal bracket 210; connect the electrical cable to a receptacle 207 on the sensor block 201; and then insert the universal bracket 210 into the wall mount 230, as shown in FIG. 12.

Figure 13:
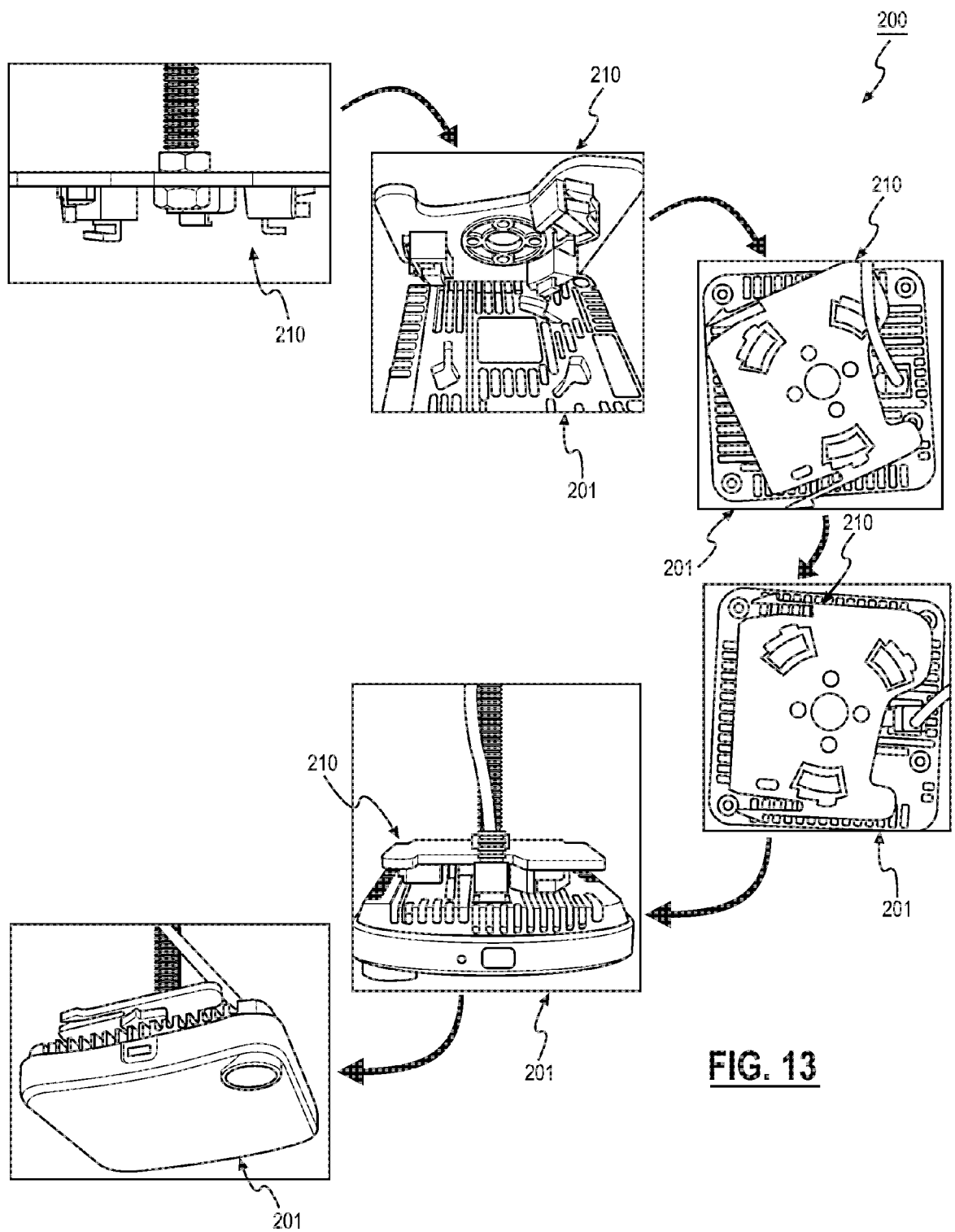
FIG. 13 is a schematic representation of one variation of the second system.

In yet another example, for a target location including a suspended rod from a ceiling surface, the installer may: install the suspended rod through a mounting bore 214 of the universal bracket 210 with a set of fasteners 234; bore a hole into the ceiling surface; pull an electrical (e.g., power and data) cable behind the ceiling and through this hole; route the electrical cable down the suspended rod around the cutaway feature 212 of the universal bracket 210; connect the electrical cable to a receptacle 207 on the sensor block 201; and then install the sensor block 201 onto the universal bracket 210, as shown in FIG. 13.

Figure 14:
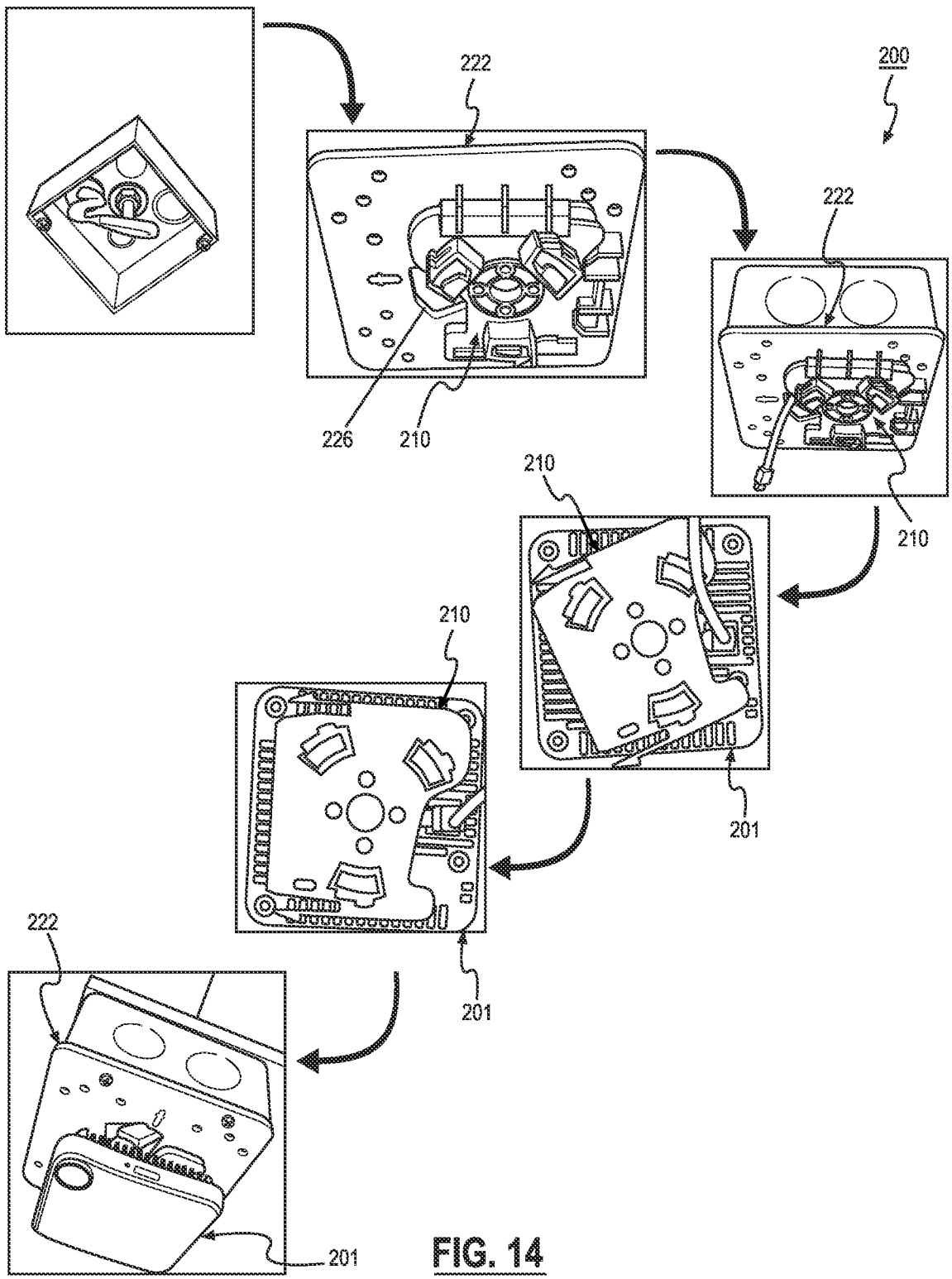
FIG. 14 is a schematic representation of one variation of the second system.

In another example, for a target location including a ceiling surface with a pre-installed electrical junction box, the installer may: insert the universal bracket 210 into the junction mount 222; pull an electrical cable from the electrical junction box through a port in the junction mount 222; route the electrical cable around the cutaway feature 212 of the universal bracket 210; install the junction mount 222 to the electrical junction box with a set of fasteners 234; connect the electrical cable to the receptacle 207 of the sensor block 201; and then install the sensor block 201 onto the universal bracket 210, as shown in FIG. 14.

Figure 15:
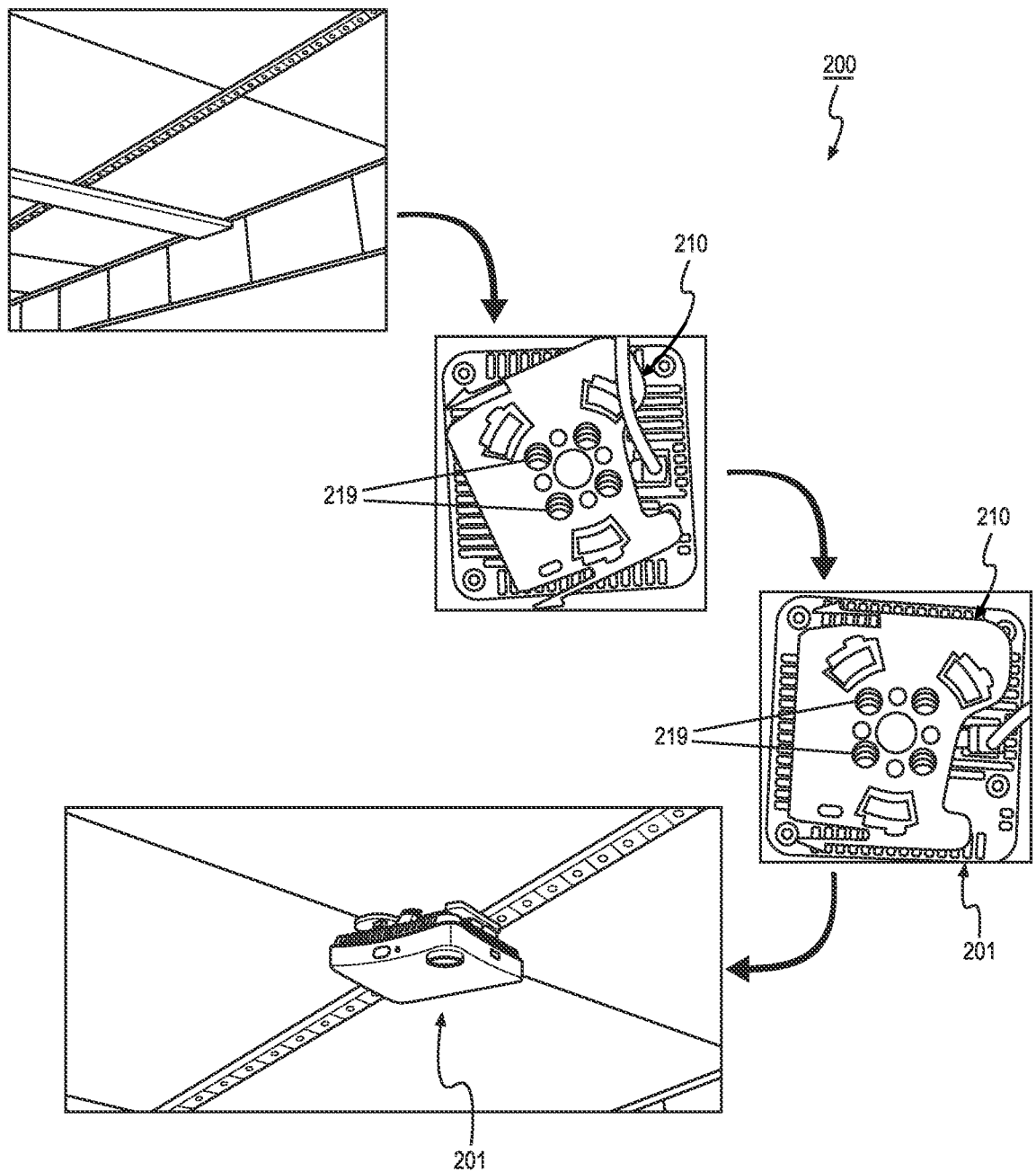
FIG. 15 is a schematic representation of one variation of the second system.

In yet another example, for a target location including a T-bar ceiling, the installer may: pull an electrical (e.g., power and data) cable behind a panel of the T-bar ceiling; install the sensor block 201 onto the universal bracket 210; route the electrical cable around the cutaway feature 212 of the universal bracket 210; connect the electrical cable to the receptacle 207 of the sensor block 201; and then install the universal bracket 210 onto the T-bar ceiling by aligning a set of magnets 219 with the ferromagnetic elements of the T-bar ceiling, as shown in FIG. 15.

Furthermore, once each sensor block 201 is installed according to the aforementioned plan of target locations, the computer system can activate the sensor blocks 201 and confirm realization of predefined rules, generated by the computer system, based on target locations and/or orientations of each sensor block 201. For example, the computer system can receive one or more images (e.g., raw color images or feature-space images) from each sensor block 201 and then estimate an installation location and/or an installation orientation for each sensor block 201, based on automatic detection of overlapping regions in these images. The computer system can then map each installation location and/or orientation to the target locations within the office floorspace and detect location and orientation deviations from the plan (e.g., greater than a predetermined location threshold, greater than a predetermined orientation threshold). Then, responsive to detection of location and/or orientation deviations, the computer system can replace the target locations, in the plan, with these installation location and orientation deviations. Therefore, the computer system can implement spatial and field of view overlap constraints of the office floorspace to minimize spatial repositioning of sensor blocks 201 after installation.

Additionally or alternatively, the computer system can: receive a set of images from each sensor block 201; identify areas of interest located within the field of view of each sensor block 201; and detect an overlap between the fields of view of adjacent sensor blocks 201 according to a minimum overlap threshold. Responsive to detection of an overlap between fields of view of a particular set of adjacent sensor blocks 201 less than the minimum overlap threshold, the computer system can generate an updated target location for this particular adjacent set of sensor blocks 201 and/or other nearby sensor blocks 201 to bring this area of interest into view across all sensor blocks 201 installed in the office space. Additionally or alternatively, the computer system can generate a prompt indicating to a user and/or installer that the area of interest is not fully located within the fields of view of this particular set of adjacent sensor blocks 201. Then, the user and/or installer may spatially adjust this particular set of adjacent sensor blocks 201.

Therefore, the computer system can: receive a digital office floorplan; extract features and areas of interest from the floorplan; generate an installation plan with a target location for each sensor block; identify installation errors for each sensor block; and verify with a user and/or installer that each sensor block is installed at the target location with a detected area of interest within the minimum overlap threshold.

3.3 Sensor Block

As shown in FIGS. 10 and 11, the sensor block 201 includes a housing 202 for an image sensor 206. The sensor block 201 also includes a receptacle 207 configured to receive an electrical cable to provide power and/or data to the image sensor 206 and a set of engagement features 205 to enable attachment with a universal bracket 210 without tools.

For example, the sensor block 201 includes: a housing 202 defining a front face 203 and a rear face 204 opposite the front face 203 and defining a set of engagement features 205; an image sensor 206 arranged in the housing 202 and facing outwardly from the front face 203 of the housing 202; and a receptacle 207 arranged on the rear face 204 of the housing 202 and configured to receive an electrical cable.

Furthermore, the sensor block 201 is configured to rotate over a first angular length to engage the engagement features 205 with a first set of retention features 217 on the universal bracket 210. The cutaway feature 212 of the universal bracket 210 defines a relief along an arc of a second angular length greater than the first angular length to pass the electrical cable, inserted into the receptacle 207, during rotation of the sensor block 201 onto the universal bracket 210. The sensor block 201 is also offset below the universal bracket 210 when installed thereon to enable the electrical cable to form a large bend and avoid pinching when the sensor block 201 is rotated onto the universal bracket 210 during installation and removal.

The receptacle 207 is offset from the center of the rear face 204 of the housing 202 and configured to align with the cutaway feature 212 of the universal bracket 210. More specifically, the receptacle 207 is located near a lead edge of the sensor block 201 and aligns with the cutaway feature 212 of the universal bracket 210. Thus, the universal bracket 210 can be installed to a surface, post, and/or threaded rod without interference by the electrical cable when the electrical cable is connected to the receptacle 207. The electrical cable is configured to provide power and/or data to the sensor block 201. Additionally or alternatively, the sensor block 201 can connect to a Wi-Fi network. Furthermore, the sensor block 201 can be detached from the universal bracket 210 for servicing or replacement by another sensor block 201 by applying torque. For example, the sensor block 201 is configured to detach from the universal bracket 210 by applying a range of torque between 4-7 pounds and configured to repeatably attach to the universal bracket 210.

Therefore, the sensor block 201 can be transiently installed onto the universal bracket 210 with a short, simple motion and without tools. The sensor block 201 is also offset below the universal bracket 210 when installed thereon to enable the electrical cable to form a large bend and avoid pinching when the sensor block 201 is rotated onto the universal bracket 210 during installation and removal. Furthermore, the sensor block 201 enables the universal bracket 210 to mount to a post or threaded rod without interference by the electrical cable when the electrical cable is connected to the receptacle 207. The universal bracket 210 is further configured to simply detach from the universal bracket 210 when rotated onto the universal bracket 210.

3.3.1 Image Sensor+Computer System

As shown in FIG. 11, the sensor block 201 is installed onto the universal bracket 210 with a short, simple motion and without tools. The universal bracket 210 is fastened to a ceiling surface, and the image sensor 206 is arranged in the sensor block 201 at a first height range, opposite of a floor, to capture images of the office floorspace.

Generally, in this variation, the image sensor 206 is arranged in the sensor block 201 at the first height range opposite of the floor. The image sensor 206 captures an image of the office floorspace within the field of view of the sensor block 201. The sensor block 201 detects types, locations, and orientations of objects within this image. Then, the sensor block 201 stores data of these types, locations, and orientations of objects in this image into an object container and offloads this object container to the computer system. The sensor block 201 repeats these steps for each subsequent image within a regular interval of time (e.g., one-minute interval, ten-minute interval). The computer system can then collect object containers from each sensor block 201 in the office space and compile these data into locations, object flow, and asset tracking for the space over time.

More specifically, the computer system can generate latitudinal and longitudinal positions of discrete areas of the floorspace that fall within fields of view of each pixel of image sensors 206 in a set of sensor blocks 201. In particular, the computer system can connect each pixel to a discrete location within the office floorspace. During subsequent operation of this set of sensor blocks 201, the computer system can: collect images recorded by this set of sensor blocks 201, such as on a regular ten-minute interval; identify objects (e.g., humans, monitors, desks, chairs, laptops) in these images; determine discrete locations within the floorspace occupied by these objects; and thus, track occupancy and asset usage within the space in real-time and over extended periods of time. More specifically, these sensor blocks 201 can collect optical data, such as in the form of one-color image per ten-minute interval; and the computer system can generate predictions related to desk usage and asset tracking within the office floorspace from these optical data. The computer system can include one or more computational devices connected via a network (e.g., the Internet, LAN, etc.) to a local gateway. Furthermore, the local gateway is connected wirelessly to each of the sensor blocks 201 to facilitate the receipt of images from the sensor blocks 201 by the computer system.

For example, the image sensor 206 defines a field of view and coverage of a room and is configured to capture an image representing: a backpack occupying a floor in the field of view of the image sensor 206 with a first minimum number of pixels per unit area to enable machine recognition of the backpack; and a head of a human standing on the floor in the field of view of the image sensor 206 with a maximum number of pixels per unit area greater than a second minimum number of pixels per inch to enable machine recognition of the human.

Therefore, the image sensor 206 can capture images within the field of view of the office floorspace and the sensor block 201 can detect these objects and generate discrete locations within the floorspace occupied by these objects. Then, the computer system can track occupancy and asset usage within the space in real-time and/or over extended periods of time.

3.4 Universal Bracket

As shown in FIG. 10, the universal bracket 210 includes: a first set of retention features 217 to retain the set of engagement features 205 of the housing 202 of the sensor block 201; a first set of through-holes 215 to directly mount the universal bracket 210 to a solid ceiling surface; a first mounting bore 214 to mount the universal bracket 210 to a suspended hanging rod from a ceiling surface; and a set of latches 213 to engage with the junction mount 222 for other ceiling surfaces or the wall mount 230 for vertical wall surfaces. The universal bracket 210 engages with the sensor block 201, the junction mount 222, and the wall mount 230 without the use of tools.

For example, the universal bracket 210 defines a first mounting plate 211. The first mounting plate 211 includes: a cutaway feature 212 arranged on an edge of the universal bracket 210 and configured to pass the electrical cable to the receptacle 207; and a set of latches 213. The universal bracket 210 further defines: a first mounting bore 214 configured to receive a mounting rod suspended from the ceiling surface; a first set of through-holes 215 arranged about the first mounting bore 214 and configured to receive a set of fasteners 234 to mount the universal bracket 210 to the ceiling surface; a first set of standoffs 216 extending below the first mounting plate 211, arranged about the first mounting bore 214, and configured to offset the rear face 204 of the housing 202 below the first mounting plate 211; and a first set of retention features 217 arranged on the set of standoffs and configured to transiently engage and retain the set of engagement features 205 of the housing 202.

Furthermore, the first set of through-holes 215 are rotationally arranged about the first mounting bore 214, the first set of standoffs 216 extend below the first mounting plate 211 and are asymmetrically arranged about the first set of through-holes 215, and the first set of retention features 217 are rotationally arranged to align on the first set of standoffs 216.

In one implementation, the universal bracket 210 can include a visual indicator 218 (e.g., in the form of symbols or an asymmetrical shape) to indicate to a user the rotational orientation of the image sensor 206, thereby facilitating accurate placement of the sensor block 201 onto a surface. For example, the second system 200, can include the universal bracket 210 defining a visual indicator 218 arranged on the first mounting plate 211 and configured to constrain the orientation of the optical image sensor 206 arranged in the housing 202 of the sensor block 201.

Additionally, the universal bracket 210 can be installed in a variety of configurations depending on the designated target location for the sensor block 201. In a first configuration: the sensor block 201 is arranged on the universal bracket 210 and the universal bracket 210 is fastened to a solid ceiling surface. In a second configuration: the sensor block 201 is arranged on the universal bracket 210; and the universal bracket 210 is fastened to a mounting rod suspended from a ceiling surface. In a third configuration: the sensor block 201 is arranged on the universal bracket 210; the universal bracket 210 is inserted into the junction mount 222; and the junction mount 222 is fastened to an electrical junction box pre-installed to a ceiling surface. In a fourth configuration: the sensor block 201 is arranged on the universal bracket 210; the universal bracket 210 is inserted into the wall mount 230; and the wall mount 230 is fastened to the vertical wall surface. In a fifth configuration: the sensor block 201 is arranged on the universal bracket 210; and the universal bracket 210 is magnetically coupled to an assembly of grid segments of a grid ceiling surface (e.g., T-bar ceiling).

Therefore, the universal bracket 210 functions to interface the sensor block 201 to other mounts for other mounting configurations on ceiling surfaces, wall surfaces, suspended hanging rods, and/or posts, etc.

3.5 Magnet Array

As shown in FIG. 15, the universal bracket 210 can include an array of magnets configured to magnetically couple to a T-bar ceiling surface as described above. The array of magnets can be installed or embedded (e.g., overmolded) into the universal bracket 210 to form a single contiguous structure.

In this variation, the set of magnets 219 can include permanent magnets, such as rare-earth neodymium magnets, in order to increase the strength of the magnetic field produced by these magnets and, therefore, increase the weight that can be supported by the second system 200. However, the second system 200 can also include other types of permanent magnets such as those manufactured from other ferromagnetic materials such as alloys of iron, nickel, cobalt, etc. Additionally, the magnets can be coated or covered with a thin layer of a soft material (e.g., rubber, plastic, silicone) to prevent pinching of a user's fingers between a magnet and assembly of grid segments of the grid ceiling (or any other ferromagnetic object) during installation of the second system 200. Each magnet in the set of magnets 219 is configured to align and interface with the ferromagnetic elements of the grid ceiling, thereby securing the universal bracket 210 to the grid ceiling.

For example, the universal bracket 210 includes a first mounting plate 211 defining a set of magnets 219: arranged in a cavity of the engagement plate about the first mounting bore 214; characterized by a first height greater than a protrusion distance of the outer surface of a ceiling tile in a set of ceiling tiles below a grid segment in an assembly of grid segments of a grid ceiling surface; and configured to couple the universal bracket 210 to the assembly of grid segments of the grid ceiling surface.

Furthermore, the universal bracket 210 can include a set of magnets 219 defining a variety of magnet shapes (e.g., cylindrical shape, or annular ring shape) configured to fit around the features of the universal bracket 210. The set of magnets 219 are characterized by a first width less than an exposed width of the grid segment of the assembly of grid segments and arranged to align with ferromagnetic elements of the assembly of grid segments. Additionally, the set of magnets 219 are characterized by a combined magnetic coupling force to couple the universal bracket 210 to the assembly of grid segments of the grid ceiling surface.

3.6 Wall Mount

The wall mount 230 provides mounts to a vertical wall surface with a set of fasteners 234 and a second latch retainer 233 can retain the set of latches 213 of the universal bracket 210 without any tools.

For example, the wall mount 230 includes: a bracket section 231 defining a third set of through-holes 215 configured to receive the set of fasteners to mount the wall mount 230 to a vertical wall surface; and a second latch retainer 233 cantilevered from the bracket section 231 configured to receive and retain the set of latches 213 of the universal bracket 210.

Therefore, the wall mount 230 can fasten to any vertical wall surface with a set of fasteners 234 and receive a sensor block 201 arranged on the universal bracket 210 to mount the sensor block 201 to vertical wall surfaces.

3.6.1 Wall Mount+Universal Bracket

As shown in FIG. 12, the sensor block 201 is arranged on the universal bracket 210, the universal bracket 210 is inserted into the wall mount 230, and the wall mount 230 is fastened to the vertical wall surface.

More specifically and as described above, the wall mount 230 is configured to attach to a vertical wall surface at an angle range (e.g., 75 degrees to 85 degrees) to locate the field of view of the image sensor 206 away from the wall and toward a space (e.g., an office space, or a workspace) below. For example, the second latch retainer 233 is configured to angularly offset from the bracket section 231 by an acute angle between 75 degrees and 85 degrees to locate an edge of a field of view of the image sensor 206 proximal a bottom corner of the vertical wall surface when the sensor block 201 is inserted into the wall mount 230 and the wall mount 230 is fastened to the vertical wall surface.

The wall mount 230 is configured to receive the set of latches 213 of the universal bracket 210, which are arranged on opposite edges to engage with the second latch retainer 233 of the wall mount 230. Furthermore, the wall mount 230 includes the second latch retainer 233 defining a receiver configured to receive a first edge of the universal bracket 210 and a second set of retention features. The universal bracket 210 defines the set of latches 213: extending toward the first edge; configured to insert into the receiver; configured to engage the second set of retention features of the second latch retainer 233; and defining the cutaway feature 212 along a second edge opposite the first edge.

Therefore, the wall mount 230 can receive the universal bracket 210 to mount a sensor block 201 to a vertical wall surface within the field of view of an image sensor 206.

2.7 Junction Mount

As shown in FIG. 14, to install the sensor block 201 over a pre-installed electrical junction box (e.g., a surface mount electrical junction box attached to a ceiling surface), the junction mount 222 is fastened directly to the electrical junction box with a set of fasteners, such as by aligning through-holes in the junction mount 222 to extant threaded holes in the electrical junction box. The sensor block 201 is then arranged onto the universal bracket 210, which is then installed on the junction mount 222 by aligning the set of latches 213 of the universal bracket 210 with the set of latch retainers 224 of the junction mount 222, such that the port 226 of the junction mount 222 aligns with the cutaway feature 212 of the universal bracket 210.

In this implementation, the junction mount 222 includes a set of latch retainers 224 configured to receive the set of latches 213 of the universal bracket 210. Accordingly, when the universal bracket 210 is inserted into the junction mount 222, the set of latch retainers 224 engage the set of latches 213 and retain the universal bracket 210 against the junction mount 222.

The junction mount 222 also includes a set of through-holes to receive a set of fasteners 234 to fasten the junction mount 222 to an extant electrical junction box, such as previously installed on a ceiling surface.

In one example, the junction mount 222 includes a second mounting plate 223 defining: a set of latch retainers 224 configured to receive and retain the set of latches 213 of the universal bracket 210; a second set of through-holes 215 arranged about the set of latch retainers 224 and configured to couple the junction mount 222 to an electrical junction box; and a port 226 configured to pass the electrical cable to the receptacle 207 of the housing 202 of the sensor block 201. The port 226 is further configured to align with the cutaway feature 212 of the universal bracket 210 to pass the electrical cable to the receptacle 207 of the sensor block 201. Thus, allowing the electrical cable to pass through the junction mount 222 and the universal bracket 210 to the receptacle 207 of the image sensor 206 without causing damage to the electrical cable.

Furthermore, the pre-installed electrical junction box is configured to contain at least one or more wiring connections (e.g., electrical wires, electrical cables, or circuit cables) within the electrical junction box. After installation of the electrical junction box, the junction mount 222 can receive a set of fasteners 234 through the set of through-holes to attach to the electrical junction box.

Therefore, the junction mount 222: functions to interface the sensor block 201 and the universal bracket 210 to a pre-installed electrical junction box on a ceiling surface; and enables the sensor block 201 to be installed, removed, and repeatably reinstalled to the same or similar position on the electrical junction box.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A system for mounting an image sensor to a surface comprising:
    a sensor block comprising:
        a housing defining:
            a front face; and
            a rear face opposite the front face and defining a set of engagement features;
        an image sensor:
            arranged in the housing; and
            facing outwardly from the front face of the housing;
        a receptacle:
            arranged on the rear face of the housing; and
            configured to receive an electrical cable; and
    a kit of mounts comprising:
        a universal bracket defining:
            a first mounting plate comprising:
                a cutaway feature arranged on an edge of the universal bracket and configured to pass the electrical cable to the receptacle; and
                a set of latches;
            a first mounting bore configured to receive a mounting rod suspended from a ceiling surface;
            a first set of through-holes arranged about the first mounting bore and configured to receive a set of fasteners to mount the universal bracket to the ceiling surface;
            a first set of standoffs extending below the first mounting plate, arranged about the first mounting bore, and configured to offset the rear face of the housing below the first mounting plate; and
            a first set of retention features arranged on the set of standoffs and configured to transiently engage and retain the set of engagement features of the housing; and
        a junction mount comprising a second mounting plate:
            a set of latch retainers configured to receive and retain the set of latches of the universal bracket;
            a second set of through-holes arranged about the set of latch retainers and configured to couple the junction mount to an electrical junction box; and
            a port configured to pass the electrical cable to the receptacle.

2. The system of claim 1, wherein:
    in a first configuration:
        the sensor block is arranged on the universal bracket; and
        the universal bracket is fastened to the ceiling surface;
    in a second configuration:
        the sensor block is arranged on the universal bracket; and
        the universal bracket is fastened to the mounting rod suspended from the ceiling surface; and
    in a third configuration:
        the sensor block is arranged on the universal bracket;
        the universal bracket is inserted into the junction mount; and
        the junction mount is fastened to the electrical junction box.

3. The system of claim 1, further comprising a wall mount defining:
a bracket section defining a third set of through-holes configured to receive the set of fasteners to mount the wall mount to a vertical wall surface; and
a second latch retainer cantilevered from the bracket section and configured to receive and retain the set of latches of the universal bracket.

4. The system of claim 3, wherein:
the second latch retainer comprises a receiver configured to receive a first edge of the universal bracket and a second set of retention features; and
the universal bracket:
defines the set of latches:
extending toward the first edge;
configured to insert into the receiver; and
configured to engage the second set of retention features of the second latch retainer; and
defines the cutaway feature along a second edge opposite the first edge.

5. The system of claim 3, wherein:
in a first configuration:
the sensor block is arranged on the universal bracket; and
the universal bracket is fastened to the ceiling surface;
in a second configuration:
the sensor block is arranged on the universal bracket; and
the universal bracket is fastened to the mounting rod suspended from the ceiling surface;
in a third configuration:
the sensor block is arranged on the universal bracket;
the universal bracket is inserted into the junction mount; and
the junction mount is fastened to the electrical junction box; and
in a fourth configuration:
the sensor block is arranged on the universal bracket;
the universal bracket is inserted into the wall mount; and
the wall mount is fastened to the vertical wall surface.

6. The system of claim 3, further comprising the second latch retainer configured to angularly offset from the bracket section by an acute angle between 75 degrees and 85 degrees to locate an edge of a field of view of the image sensor proximal a bottom corner of the vertical wall surface when the sensor block is inserted into the wall mount and the wall mount is fastened to the vertical wall surface.

7. The system of claim 1, wherein:
the sensor block is configured to rotate over a first angular length to engage the engagement features to the first set of retention features on the universal bracket; and
the cutaway defines a relief along an arc of a second angular length greater than the first angular length to pass the electrical cable, inserted into the receptacle, during rotation of the sensor block on the universal bracket.

8. The system of claim 1, wherein:
in a first configuration:
the sensor block is arranged on the universal bracket;
the universal bracket fastened to the ceiling surface; and
the image sensor is arranged in a first height range opposite of a floor; and
the image sensor:
defines a field of view and coverage of a room; and
is configured to capture an image representing:
a backpack occupying a floor in the field of view of the image sensor with a first minimum number of pixels per unit area to enable machine recognition of the mobile computing device; and
a head of a human standing on the floor in the field of view of the image sensor with a maximum number of pixels per unit area greater than a second minimum number of pixels per inch to enable machine recognition of the human.

9. The system of claim 1, wherein:
the first set of through-holes are rotationally arranged about the first mounting bore and configured to receive the set of fasteners to mount the universal bracket to the ceiling surface;
the first set of standoffs extend below the first mounting plate and are asymmetrically arranged about the first set of through-holes, and configured to offset the rear face of the housing below the first mounting plate; and
the first set of retention features are rotationally arranged to align on the first set of standoffs and configured to transiently engage and retain the engagement features of the housing.

10. The system of claim 1, wherein the universal bracket defines a visual indicator arranged on the first mounting plate and configured to constrain the orientation of the image sensor arranged in the housing of the sensor block.

11. The system of claim 1, wherein the sensor block is configured to detach from the universal bracket by applying a range of torque between 4-7 pounds and configured to repeatably attach to the universal bracket.

12. The system of claim 1, wherein the universal bracket comprises the first mounting plate defining a set of magnets:
arranged in a set of cavities of the engagement plate about the first mounting bore;
characterized by a first height greater than a protrusion distance of the outer surface of a ceiling tile in a set of ceiling tiles below a grid segment in an assembly of grid segments of a grid ceiling surface; and
configured to couple the universal bracket to the assembly of grid segments of the grid ceiling surface.

13. The system of claim 12, wherein the set of magnets characterized by a combined magnetic coupling force to couple the universal bracket to the assembly of grid segments of the grid ceiling surface.

14. The system of claim 12, wherein the set of magnets characterized by a first width less than an exposed width of the grid segment of the assembly of grid segments and arranged to align with ferromagnetic elements of the assembly of grid segments.

15. The system of claim 12, wherein:
in a first configuration:
the sensor block is arranged on the universal bracket; and
the universal bracket is fastened to the ceiling surface;
in a second configuration:
the sensor block is arranged on the universal bracket; and
the universal bracket is fastened to the mounting rod suspended from the ceiling surface;
in a third configuration:
the sensor block is arranged on the universal bracket;
the universal bracket is inserted into the junction mount; and
the junction mount is fastened to the electrical junction box; and wherein, in a fourth configuration:
the sensor block is arranged on the universal bracket; and
the universal bracket is magnetically coupled to the assembly of grid segments of the grid ceiling surface.

16. A system for mounting an image sensor to a surface comprising:
a sensor block comprising:
a housing defining:
a front face; and
a rear face opposite the front face and defining a set of engagement features;
an image sensor:
arranged in the housing; and
facing outwardly from the front face of the housing;
a receptacle:
arranged on the rear face of the housing; and
configured to receive an electrical cable;
a universal bracket defining:
a first mounting plate comprising:
a cutaway feature arranged on an edge of the universal bracket and configured to pass the electrical cable to the receptacle; and
a set of latches;
a first mounting bore configured to receive a mounting rod suspended from a ceiling surface;
a first set of through-holes arranged about the first mounting bore and configured to receive a set of fasteners to mount the universal bracket to the ceiling surface;
a first set of standoffs extending below the first mounting plate, arranged about the first mounting bore, and configured to offset the rear face of the housing below the first mounting plate; and
a first set of retention features arranged on the set of standoffs and configured to transiently engage and retain the set of engagement features of the housing;
a junction mount defining a second mounting plate comprising:
a set of latch retainers configured to receive and retain the set of latches of the universal bracket;
a second set of through-holes arranged about the set of latch retainers and configured to couple the junction mount to an electrical junction box; and
a port configured to pass the electrical cable to the receptacle;
a wall mount defining:
a bracket section defining a third set of through-holes configured to receive the set of fasteners to mount the wall mount to a vertical wall surface; and
a second latch retainer cantilevered from the bracket section configured to receive and retain the set of latches of the universal bracket; and
a set of fasteners.

17. The system of claim 16, wherein the set of fasteners:
configured to couple the universal bracket to the ceiling surface;
configured to couple the junction mount to the electrical junction box; and
configured to couple the wall mount to the vertical wall surface.

18. The system of claim 16, wherein:
in a first configuration:
the sensor block is arranged on the universal bracket;
the universal bracket is inserted into the junction mount; and
the junction mount in fastened to the electrical junction box; and
the port configured to pass the electrical cable to the receptacle comprises the port configured to align with the cutaway feature of the universal bracket to pass the electrical cable to the receptacle of the sensor block.

19. The system of claim 16, wherein:
in a first configuration:
the sensor block is arranged on the universal bracket; and
the universal bracket is fastened to the ceiling surface;
in a second configuration:
the sensor block is arranged on the universal bracket; and
the universal bracket is fastened to the mounting rod suspended from the ceiling surface;
in a third configuration:
the sensor block is arranged on the universal bracket;
the universal bracket is inserted into the junction mount; and
the junction mount is fastened to the electrical junction box; and
in a fourth configuration:
the sensor block is arranged on the universal bracket;
the universal bracket is inserted into the wall mount; and
the wall mount is fastened to the vertical wall surface.

* * * * *